United States Patent
Nagai et al.

(10) Patent No.: US 9,170,802 B2
(45) Date of Patent: Oct. 27, 2015

(54) METHOD AND INFORMATION PROCESSING APPARATUS FOR EXTRACTING SOFTWARE CORRECTION PATCH FOR VIRTUAL MACHINE

(71) Applicant: FUJITSU LIMITED, Kawasaki-shi, Kanagawa (JP)

(72) Inventors: Takayuki Nagai, Harima (JP); Shigeru Fujimoto, Nishinomiya (JP); Takashi Sasada, Kobe (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/305,069

(22) Filed: Jun. 16, 2014

(65) Prior Publication Data

US 2014/0380293 A1 Dec. 25, 2014

(30) Foreign Application Priority Data

Jun. 24, 2013 (JP) .................................. 2013-132123

(51) Int. Cl.
*G06F 9/44* (2006.01)
*G06F 9/455* (2006.01)
*G06F 9/445* (2006.01)

(52) U.S. Cl.
CPC .............. *G06F 8/65* (2013.01); *G06F 9/45558* (2013.01)

(58) Field of Classification Search
CPC ............................... G06F 8/65; G06F 9/45533
USPC ....................... 717/168–173; 718/1
See application file for complete search history.

(56) References Cited

U.S. PATENT DOCUMENTS

| | | | | |
|---|---|---|---|---|
| 6,202,208 B1* | 3/2001 | Holiday, Jr. | .................... | 717/166 |
| 8,291,409 B2* | 10/2012 | Winner et al. | ..................... | 718/1 |
| 8,464,241 B2* | 6/2013 | Hayton | ......................... | 717/170 |
| 8,650,556 B2* | 2/2014 | McNeill | ......................... | 717/173 |
| 8,839,228 B2* | 9/2014 | Thorat et al. | ................... | 717/172 |
| 2006/0101457 A1* | 5/2006 | Zweifel et al. | ................. | 717/174 |

(Continued)

FOREIGN PATENT DOCUMENTS

JP  2009-538469  11/2009
JP  2012-003651  1/2012

(Continued)

OTHER PUBLICATIONS

Vlieghe, Vincent, "The Art of Patching your Virtual Infrastructure (Part 1)," <http://www.virtualizationadmin.com/articles-tutorials/vmware-esx-and-vsphere-articles/general/art-patching-virtual-infrastructure-part1.html>, Oct. 8, 2008, p. 1-5.*

(Continued)

*Primary Examiner* — Qing Chen
(74) *Attorney, Agent, or Firm* — Fujitsu Patent Center

(57) ABSTRACT

A management server refers to a server information management DB that stores therein information on a plurality of virtual servers generated from a plurality of virtual images and information on software that operates on the virtual servers, and selects other virtual server in conjunction with a particular virtual server from the plurality of virtual servers based on information on the particular virtual server generated from a predetermined virtual image and information on software that operates on the particular virtual server. The management server extracts a patch to be applied to the particular virtual server based on patches applied to the other virtual server.

8 Claims, 15 Drawing Sheets

(56) References Cited

U.S. PATENT DOCUMENTS

| | | | |
|---|---|---|---|
| 2006/0218544 A1* | 9/2006 | Chakraborty et al. | 717/168 |
| 2007/0271561 A1* | 11/2007 | Winner et al. | 718/1 |
| 2008/0282241 A1* | 11/2008 | Dong | 718/1 |
| 2008/0301676 A1* | 12/2008 | Alpern et al. | 718/1 |
| 2009/0007105 A1* | 1/2009 | Fries et al. | 718/1 |
| 2009/0100420 A1* | 4/2009 | Sapuntzakis et al. | 717/171 |
| 2009/0292737 A1* | 11/2009 | Hayton | 707/200 |
| 2010/0100880 A1* | 4/2010 | Shigeta et al. | 718/1 |
| 2010/0100881 A1* | 4/2010 | Shigeta et al. | 718/1 |
| 2010/0287544 A1* | 11/2010 | Bradfield et al. | 717/172 |
| 2011/0265076 A1* | 10/2011 | Thorat et al. | 717/172 |
| 2011/0302580 A1* | 12/2011 | Iikura et al. | 718/1 |
| 2012/0066680 A1* | 3/2012 | Amano et al. | 718/1 |
| 2012/0124581 A1* | 5/2012 | Nitta | 718/1 |
| 2012/0174086 A1* | 7/2012 | Raju et al. | 717/168 |
| 2013/0047147 A1* | 2/2013 | McNeill | 717/173 |
| 2013/0132945 A1* | 5/2013 | Anderson et al. | 718/1 |
| 2013/0254765 A1* | 9/2013 | Shinohara et al. | 718/1 |
| 2013/0263128 A1* | 10/2013 | Yamazaki | 718/1 |
| 2014/0359617 A1* | 12/2014 | Fontignie et al. | 718/1 |

FOREIGN PATENT DOCUMENTS

| | | |
|---|---|---|
| JP | 2012-168710 | 9/2012 |
| WO | 2007/136448 | 11/2007 |

OTHER PUBLICATIONS

Zhou et al., "Always Up-to-date—Scalable Offline Patching of VM Images in a Compute Cloud," Dec. 2010, ACM, p. 377-386.*

* cited by examiner

FIG.4

| TEMPLATE | OS | MW INFORMATION | | | APPLIED PATCH |
| --- | --- | --- | --- | --- | --- |
| | | INSTALLED MW | INSTALLATION DESTINATION | SERVICE/ PROCESS | |
| TEMPLATE 1 | XXXX2008 | ABC V2 | C:\ABC | ABC SERVICE | PATCH A<br>PATCH C |
| TEMPLATE 2 | RedHat EL6.2 | | | | PATCH X<br>PATCH Y |
| TEMPLATE 3 | XXXX2008 | DB-α V1 | C:\DB-α | DBx SERVICE<br>DBy SERVICE | PATCH A<br>PATCH B |
| TEMPLATE 4 | RedHat EL6.2 | DEF V10 | /opt/DEF | /opt/DEF/def_abc | PATCH X<br>PATCH Z |

FIG.5

| SERVER (114a) | OS (114b) | TEMPLATE (114c) | USE (114d) | OPERATION RECORD (LAST CHECK DATE) (114e) | OPERATING RATE (114f) | MW INFORMATION ||||  | LAST PATCH APPLICATION DATE (114l) | APPLIED PATCH (114m) | DELETED PATCH (114n) |
|---|---|---|---|---|---|---|---|---|---|---|---|---|
| | | | | | | INSTALLED MW (114h) | OPERATIONAL STATUS (114i) | INSTALLATION DESTINATION (114j) | SERVICE/PROCESS (LOG SIZE) (114k) | | | |
| SERVER 1 | XXXX2008SP2 | TEMPLATE 1 | Web | ○ (20XX/10/20) | 99.xx | ABC V2 | ○ | C:\ABC | ABC SERVICE (100) | 20XX/10/01 | PATCH A PATCH B PATCH C | |
| SERVER 2 | XXXX2008SP1 | TEMPLATE 1 | Web | ○ (20XX/10/20) | 98.xx | ABC V2 | ○ | C:\ABC | ABC SERVICE (100) | 20XX/10/04 | PATCH A PATCH B PATCH C PATCH D | |
| SERVER 3 | XXXX2008 | TEMPLATE 1 | Web | × (20XX/07/20) | 99.xx | ABC V2 | × | C:\ABC | ABC SERVICE (100) | 20XX/07/10 | PATCH A | |
| SERVER 4 | XXXX2008SP2 | TEMPLATE 1 | AP | ○ (20XX/10/20) | 95.xx | ABC V2　XYZ V10 | ×　○ | C:\ABC　C:\XYZ | ABC SERVICE (100)　XYZ SERVICE (100) | 20XX/10/10 | PATCH A PATCH B PATCH E | PATCH C |
| SERVER 5 | XXXX2008SP2 | TEMPLATE 1 | AP | ○ (20XX/10/20) | 99.xx | XYZ V10 | ○ | D:\XYZ | XYZ SERVICE (100) | 20XX/10/01 | PATCH A PATCH B PATCH C PATCH D PATCH G | |
| SERVER 6 | XXXX2008SP1 | TEMPLATE 1 | AP | ○ (20XX/10/20) | 97.xx | ABC V2　DB-α V1 | ○　○ | C:\ABC　D:\DB-α | ABC SERVICE (100)　DBx SERVICE DBy SERVICE (100) | 20XX/10/10 | PATCH A PATCH B PATCH C PATCH E PATCH F | |

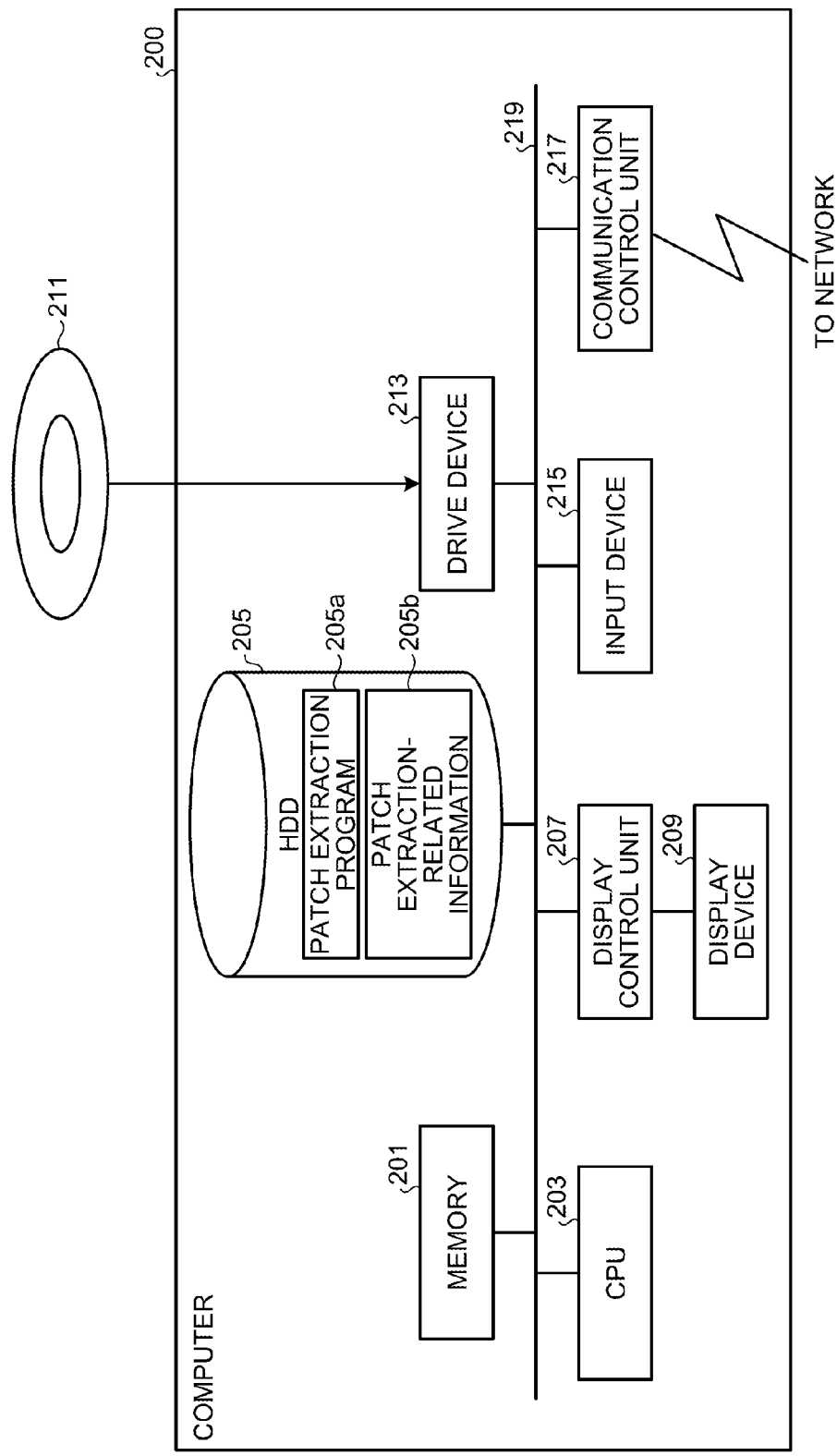

METHOD AND INFORMATION PROCESSING APPARATUS FOR EXTRACTING SOFTWARE CORRECTION PATCH FOR VIRTUAL MACHINE

CROSS-REFERENCE TO RELATED APPLICATION

This application is based upon and claims the benefit of priority of the prior Japanese Patent Application No. 2013-132123, filed on Jun. 24, 2013, the entire contents of which are incorporated herein by reference.

FIELD

The embodiment discussed herein is directed to a software correction patch extraction program.

BACKGROUND

When a virtual machine is generated on a physical machine, a software correction patch (patch) is applied to the virtual machine, and then the virtual machine is used for operations. The patch partially corrects software.

For example, a user selects a patch to be applied. Specifically, the user selects a patch that has not been applied to the generated virtual machine from patches provided by a vendor of the software that runs on the virtual machine.

A technology exists that updates a non-running out-of-date virtual machine. According to such a technology, the virtual machine includes a plurality of software structures. The non-running out-of-date virtual machine is retrieved from a library, and is restarted on a maintenance host. The maintenance host acquires a needed software update as a patch from a corresponding update source so as to update each of the out-of-date software structures (refer to Japanese National Publication of International Patent Application No. 2009-538469, for example).

However, conventional technologies of selecting a patch have a problem of not being capable of selecting an optimal patch.

As an example, a user who is not familiar with a machine environment, including an OS and middleware, is not capable of selecting an optimal patch to be applied to the virtual machine.

As another example, the technologies for updating the non-running out-of-date virtual machine merely acquire a patch of out-of-date software and update the software, and thus, the update by the patch can cause trouble in later operations. In other words, the technologies for updating the non-running out-of-date virtual machine is not always capable of selecting an optimal patch.

SUMMARY

According to an aspect of an embodiment, a non-transitory computer-readable recording medium stores a software correction patch extraction program that causes a computer to execute a process. The process includes referring to a storage unit that stores therein information on a plurality of virtual machines generated from a plurality of virtual images and information on software that operates on each of the plurality of virtual machines. The process includes selecting other virtual machine in conjunction with a particular virtual machine from the plurality of virtual machines based on information on the particular virtual machine generated from a certain virtual image and information on software that operates on the particular virtual machine. The process includes extracting a software correction patch to be applied to the particular virtual machine based on the software correction patches applied to the other virtual machine selected at the selecting.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of a data structure of a template management DB;

FIG. 5 is a diagram illustrating an example of a data structure of a server information management DB;

FIG. 17 is a diagram illustrating an example of a computer that executes a patch extraction program.

DESCRIPTION OF EMBODIMENT

Preferred embodiments of the present invention will be explained with reference to accompanying drawings. The embodiment does not limit the present invention.

Configuration of Management System According to Embodiment

Figure 1:
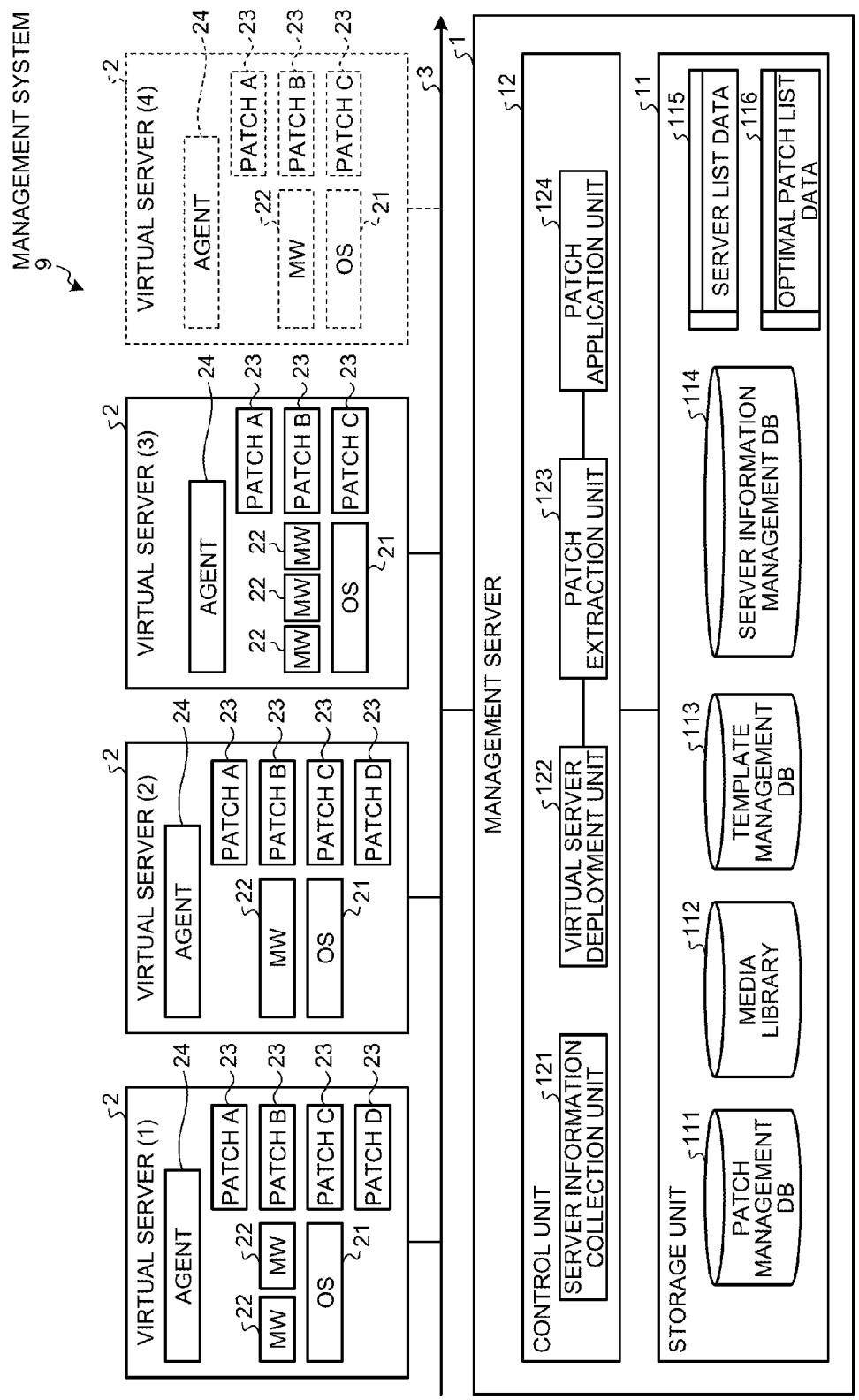
FIG. 1 is a diagram illustrating an overall configuration of a management system including a management server according to an embodiment of the present invention.

FIG. 1 is a diagram illustrating an overall configuration of a management system including a management server according to the embodiment. As illustrated in FIG. 1, this management system 9 includes a management server 1 and a plurality of virtual servers 2. The management server 1 and the virtual servers 2 are connected together via a network 3. Each of the virtual servers 2 is a virtual machine (VM), and is installed on a physical machine. The virtual servers 2 may be installed on one physical machine, or may be installed one on each physical machine.

Each of the virtual server 2 is deployed from a virtual image (template). The term "virtual image" here refers to an image of an operating system (OS) and middleware (MW) that is deployed to the virtual server 2 and installed on an actual machine. Patches to be applied to the virtual servers 2 are applied to the virtual images. Applications to be deployed to the virtual servers 2 may be installed in the virtual images.

Each of the virtual servers 2 includes an OS 21, MW 22, patches 23, and an agent 24. The OS 21, the MW 22, the patches 23, and the agent 24 are deployed from each of the virtual images before each of the virtual servers 2 is operated. The deployed virtual images are selected, for example, by a user. After the virtual server 2 has started operating, any of the patches 23 are newly applied or deleted. The patches 23 include a patch of the OS 21 and a patch or patches of the MW 22. The agent (to be described later) performs new application and deletion of the patches 23. The agents 24 are preinstalled in all the virtual images.

The agent 24 collects, for example, an operational status, information on the installed MW, and patch application information of the virtual server 2 under the control thereof, as appropriate, and performs new application and deletion of the patches 23. The agent 24 sends the collected information to the management server 1.

As an example, when instructed by the management server 1, the agent 24 collects various types of information on the virtual server 2 under the control thereof. The term "various types of information" here refers to, for example, operational information, log information on services or processes that start the MW, and an application status of the patches of the virtual server 2. The operational information of the virtual server 2 includes an operating rate of the virtual server 2. The log information on the services or processes that start the MW includes the size of the log of services or processes that start the MW. The various types of information include the log information on the services or processes that start the MW in order to allow a server information collection unit 121 (to be described later) to determine the operational status of the MW. Specifically, daily changes in the size of the log included in the log information allow the server information collection unit 121 to determine that the MW corresponding to the log is operating.

As another example, the agent 24 collects various types of information on the virtual server 2 when the virtual image is deployed to the virtual server 2 under the control thereof. In this case, the various types of information include, for example, an identification name, the OS, and the use of the virtual server 2, an installation status and an installation destination of the MW, information on the services or processes that start the MW, and the application status of the patches. Specifically, the agent 24 collects the installation status and the installation destination of the MW from an area that differs depending on the OS. For example, the agent 24 acquires them from the registry when the OS is Windows (registered trademark), or collects them from package information when the OS is UNIX (registered trademark). The agent 24 collects the information on the services or processes that start the MW from an area that differs depending on the OS. For example, the information on the services that start the MW is collected from the registry when the OS is Windows. The information on the processes that start the MW is collected from a destination module of the installation when the OS is UNIX.

As another example, the agent 24 collects various types of information on the virtual server 2 when new MW is added to the virtual server 2 under the control thereof. In this case, the various types of information include, for example, an installation status and an installation destination of the new MW, and the information on the services or processes that start the MW.

The management server 1 collects the operational information, the information on the MW, and the patch application information of existing virtual servers 2, and selects virtual servers 2 that have an identical configuration or similar configurations. Then, the management server 1 extracts patches to be applied to a virtual server 2 to be deployed from patches applied to the selected virtual servers 2. The management server 1 includes a storage unit 11 and a control unit 12.

The storage unit 11 corresponds to a storage device including, for example, a nonvolatile semiconductor memory device, such as a flash memory and a Ferroelectric Random Access Memory (FRAM, registered trademark). The storage unit 11 includes a patch management database (DB) 111, a media library 112, a template management DB 113, a server information management DB 114, server list data 115, and optimal patch list data 116.

Figure 2:
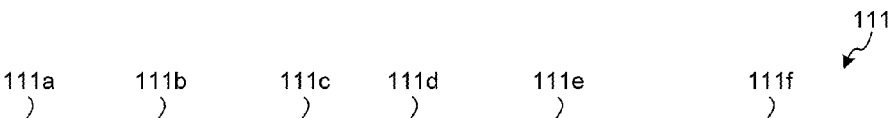
FIG. 2 is a diagram illustrating an example of a data structure of a patch management DB.

The patch management DB 111 manages information on patches released by vendors of the OSs and the MW in association with products and versions thereof. A data structure of the patch management DB 111 will be described with reference to FIG. 2. FIG. 2 is a diagram illustrating an example of the data structure of the patch management DB. As illustrated in FIG. 2, the patch management DB 111 stores therein a patch 111*a*, a product 111*b*, a type 111*c*, a summary 111*d*, a release date 111*e*, and a patch storage location 111*f*, in a mutually corresponding manner. The patch 111*a* represents an identification name of a patch. The product 111*b* represents an identification name of a product composed of a name and a version of the product to which the patch is to be applied. The type 111*c* represents a type of the patch. For example, the type 111*c* indicates whether the patch is a patch for security reasons, or whether the patch is important. The summary 111*d* represents a summary of the patch. The release date 111*e* represents the latest release date of the patch. The patch storage location 111*f* represents a storage location of the patch.

As an example, when the patch 111*a* is set to "Patch A", the patch management DB 111 stores therein "XXXX2008" as the product 111*b*, "Security" as the type 111*c*, "20XX/06/01" as the release date 111*e*, and "/Patch/OS/XXXX/ . . . " as the patch storage location 111*f*.

Figure 3:
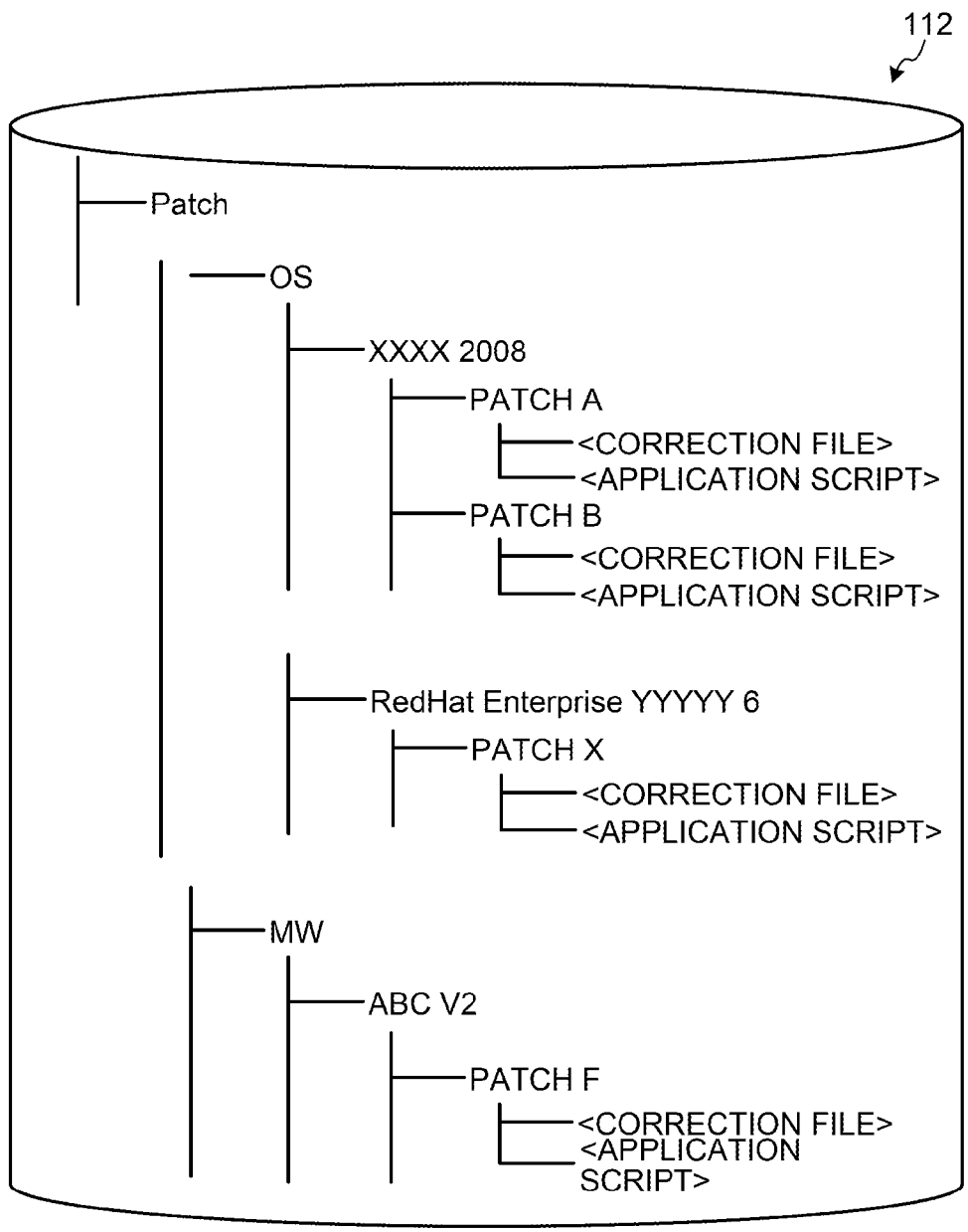
FIG. 3 is a diagram illustrating an example of a media library.

Referring back to FIG. 1, the media library 112 manages the patches themselves and scripts used for applying the patches as respective sets. An example of the media library 112 will be described with reference to FIG. 3. FIG. 3 is a diagram illustrating the example of the media library. As illustrated in FIG. 3, the media library 112 stores therein correction files and application scripts in a mutually corresponding manner on a patch-by-patch basis. Each of the correction files represents a storage location where the patch itself exists. Each of the application scripts represents a storage location where the script used for applying the patch exists. As an example, the correction file and the application script of Patch A are stored under "/Patch/OS/XXXX/Patch A". In other words, the storage location of the correction file and the application script for each patch corresponds to the patch storage location 111*f* of the patch management DB 111.

Referring back to FIG. 1, the template management DB 113 manages the templates of the virtual images. Specifically, the template management DB 113 manages information on the OSs and the MW installed in the virtual images, and the patches already applied to the virtual images. A data structure of the template management DB 113 will be described with reference to FIG. 4. FIG. 4 is a diagram illustrating an example of the data structure of the template management DB. As illustrated in FIG. 4, the template management DB 113 stores therein a template 113a, an OS 113b, MW information 113c, and an applied patch 113g, in a mutually corresponding manner. The MW information 113c includes an installed MW 113d, an installation destination 113e, and a service/process 113f.

The template 113a represents an identification name of a template corresponding to a virtual image. The OS 113b represents an OS constituting the template. The MW information 113c represents the information on MW constituting the template. The installed MW 113d represents MW installed in the virtual image corresponding to the template. The installation destination 113e represents a location where the installed MW 113d is installed in the virtual image corresponding to the template. The service/process 113f represents the information on services or processes that start the installed MW 113d. The applied patch 113g represents patches already applied to the virtual image corresponding to the template.

As an example, when the template 113a is set to "Template 1", the template management DB 113 stores therein "XXXX2008" as the OS 113b, "ABC V2" as the installed MW 113d, "C:\ABC" as the installation destination 113e, "ABC service" as the service/process 113f, and "Patch A Patch C" as the applied patch 113g.

Referring back to FIG. 1, the server information management DB 114 manages the OSs, selected templates, the uses, operation records, the information on the MW, and the information on the patches of the virtual servers 2, on a server-by-server basis. The server list data 115 is a list of virtual servers that are temporarily used when the patches are extracted by a patch extraction unit 123 (to be described later). The optimal patch list data 116 is a list of optimal patches extracted by the patch extraction unit 123 (to be described later). The server information management DB 114, the server list data 115, and the optimal patch list data 116 will be described in detail later.

The control unit 12 has an internal memory for storing therein programs specifying various processing procedures and control data, and uses the programs and the control data to perform various processes. The control unit 12 corresponds to an electronic circuit in the form of an integrated circuit such as an application-specific integrated circuit (ASIC) or a field-programmable gate array (FPGA). The control unit 12 also corresponds to an electronic circuit such as a central processing unit (CPU) or a microprocessing unit (MPU). Furthermore, the control unit 12 includes the server information collection unit 121, a virtual server deployment unit 122, the patch extraction unit 123, and a patch application unit 124.

The server information collection unit 121 collects various types of information on the virtual servers 2, on a server-by-server basis. As an example, the server information collection unit 121 periodically (for example, once a day) collects the various types of information on all of the virtual servers 2 managed by the server information management DB 114 via the agents 24. The term "various types of information" here refers to, for example, the operational information, the log information on the services or processes that start the MW, and the application status of the patches of the virtual servers 2.

The server information collection unit 121 determines the operational status of each of the virtual servers 2, based on whether information can be collected from the virtual server 2. Specifically, the server information collection unit 121 determines that the virtual server 2 is in operation when having succeeded in collecting information from the virtual server 2. The server information collection unit 121 determines that the virtual server 2 is not in operation when having failed in collecting information from the virtual server 2. The server information collection unit 121 stores the determination result in the server information management DB 114.

The server information collection unit 121 determines the operational status of the MW corresponding to the virtual server 2. For example, the server information collection unit 121 compares the size of the currently collected log of the services or processes that start the MW corresponding to the virtual server 2 with the size of the previously collected log of the services or processes that start the same MW, and determines the operational status of the MW. If the size of the currently collected log about the MW differs from the size of the previously collected log about the MW, the server information collection unit 121 determines that the MW is in operation. If the size of the currently collected log about the MW is the same as the size of the previously collected log about the MW, the server information collection unit 121 determines that the MW is not in operation. The server information collection unit 121 stores the determination result in the server information management DB 114.

The server information collection unit 121 compares the MW information on the virtual image corresponding to the virtual server 2 with the currently collected MW information, and determines MW that has been added or deleted after the deployment. As an example, when the currently collected MW information on the MW is not found in the MW information of the virtual image, the server information collection unit 121 determines that the MW has been added. When the MW information of the virtual image is not found in the currently collected MW information on the MW, the server information collection unit 121 determines that the MW has been deleted.

The server information collection unit 121 compares the information on the patches applied to the virtual image corresponding to the virtual server 2 with the currently collected information on patches, and determines patches that have been added or deleted after the deployment. In addition, the server information collection unit 121 compares the previously collected information on patches with the currently collected information on the patches, and determines patches that have been added or deleted after the previous collection.

A data structure of the server information management DB 114 will be described with reference to FIG. 5. FIG. 5 is a diagram illustrating an example of the data structure of the server information management DB. As illustrated in FIG. 5, the server information management DB 114 stores therein an OS 114b, a template 114c, a use 114d, an operation record (last check date) 114e, an operating rate 114f, and MW information 114g, in association with a server 114a. The server information management DB 114 also stores therein a last patch application date 1141, an applied patch 114m, and a deleted patch 114n, in association with the server 114a. The MW information 114g includes installed MW 114h, an operational status 114i, an installation destination 114j, and a service/process (log size) 114k.

The server 114a represents an identification name of a virtual server. The OS 114b represents an OS deployed to the server 114a. The template 114c represents a template used when the server 114a is deployed. The server 114a, the OS 114b, and the template 114c are collected and stored, for example, in advance when the virtual image is deployed to the virtual server 2 represented by the server 114a.

The use 114d represents the use of the server 114a. For example, the use 114d is stored to be "Web" when the server 114a is used as a web server, "Application (AP)" when the server 114a is used as an application server, or "Database (DB)" when the server 114a is used as a database server. The storage is performed, for example, when the virtual image is deployed to the virtual server 2 represented by the server 114a. If the use of the virtual server 2 represented by the server 114a is "AP" at the time of deployment, the use 114d is updated to "AP+DB" when software of a DB is installed later.

The operation record (last check date) 114e represents the operational status of the virtual server 2 represented by the server 114a. For example, the operation record (last check date) 114e is stored to be "O" indicating that the virtual server 2 is in operation, or "X" indicating that the virtual server 2 is not in operation. In addition, a last check date of the operational status is stored. The operating rate 114f represents the operating rate of the virtual server 2 represented by the server 114a. The server information collection unit 121 collects and stores the operation record (last check date) 114e and the operating rate 114f.

The installed MW 114h represents the MW already installed in the virtual server 2 represented by the server 114a. The operational status 114i represents the operational status of the MW represented by the installed MW 114h. For example, the operational status 114i is stored to be "O" indicating that the MW is in operation, or "X" indicating that the MW is not in operation. The installation destination 114j represents the location where the MW represented by the installed MW 114h is installed on the server 114a. The service/process (log size) 114k represents the services or processes that start the MW represented by the installed MW 114h. The service/process (log size) 114k is set to names of the services or processes that start the MW, and sizes of the collected logs of the services or processes. The server information collection unit 121 stores the operational status 114i. The installed MW 114h and the installation destination 114j are stored when the virtual image is deployed or the MW is added to the virtual server 2 represented by the server 114a. The service/process (log size) 114k is stored when the server information collection unit 121 has collected the logs of the services or processes when the virtual image was deployed or the MW was added to the virtual server 2 represented by the server 114a.

The last patch application date 114l represents a date when the applied patch 114m (to be described later) was last applied. The applied patch 114m represents patches already applied to the virtual server 2 represented by the server 114a. The deleted patch 114n represents patches deleted from the virtual server 2 represented by the server 114a. The server information collection unit 121 collects and stores the last patch application date 114l and the applied patch 114m. The deleted patches determined by the server information collection unit 121 are stored as the deleted patch 114n.

Referring back to FIG. 1, the virtual server deployment unit 122 performs the deployment to the virtual server 2 using the virtual image selected by the user. Thus, the virtual server deployment unit 122 deploys the OS and the MW installed as the virtual image and the patches applied as the virtual image to the virtual server 2.

With reference to the server information management DB 114, the patch extraction unit 123 selects other virtual servers 2, based on the information on the virtual server 2 deployed by the virtual server deployment unit 122 and the information on the MW. For example, the patch extraction unit 123 acquires the identification name of the template, the OS, the use, and the MW information of the virtual server 2 deployed by the virtual server deployment unit 122. Then, with reference to the server information management DB 114, the patch extraction unit 123 selects other virtual servers 2 that are the same as the deployed virtual server 2 in terms of the identification name of the template, the OS, the use, and a configuration of the MW. At this time, with reference to the server information management DB 114, the patch extraction unit 123 excludes other virtual servers 2 that have neither been operating nor been patched for a certain past period. This is because the virtual servers 2 that have neither been operating nor been patched for a certain past period may have had no maintenance, and a needed patch may not be extracted. The certain past period is, for example, six months, but only needs to be a period enough to determine that no maintenance has been carried out. Then, the patch extraction unit 123 lists all of the selected other virtual servers 2 in the server list data 115.

Figure 6:
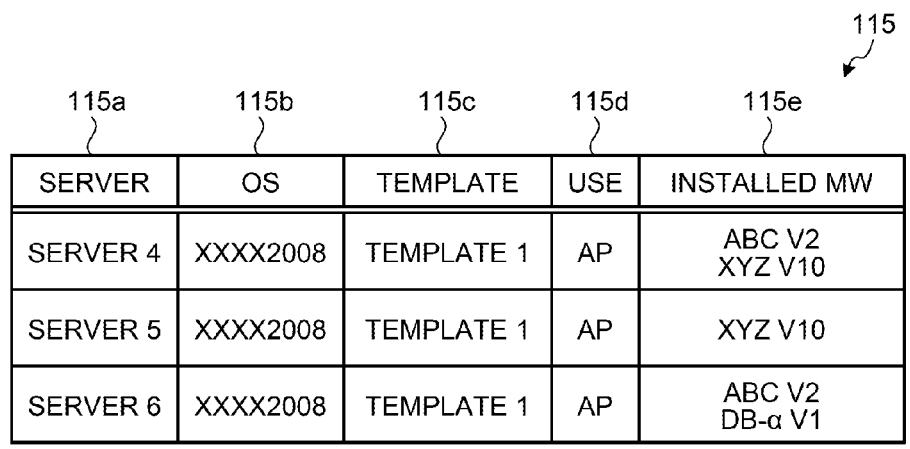
FIG. 6 is a diagram illustrating an example of a data structure of server list data.

A data structure of the server list data 115 will be described with reference to FIG. 6. FIG. 6 is a diagram illustrating an example of the data structure of the server list data. As illustrated in FIG. 6, the server list data 115 stores therein an OS 115b, a template 115c, a use 115d, and an installed MW 115e, in association with a server 115a. The server 115a, the OS 115b, the template 115c, the use 115d, and the installed MW 115e correspond to the server 114a, the OS 114b, the template 114c, the use 114d, and the installed MW 114h, respectively, of the server information management DB 114. That is, the patch extraction unit 123 copies the information on all of the selected other virtual servers 2 stored in the server information management DB 114 to the server list data 115.

As an example, when the server 115a is set to "Server 4", the server list data 115 stores therein "XXXX2008" as the OS 115b, "Template 1" as the template 115c, "AP" as the use 115d, and "ABC V2 XYZ V10" as the installed MW 115e.

Referring back to FIG. 1, when more than one of the other virtual servers 2 has been selected, the patch extraction unit 123 extracts, as patches to be applied, patches applied in common to the other virtual servers 2 among respective patches applied thereto. Also, the patch extraction unit 123 selects patches applied to any of the other virtual servers 2. The patch extraction unit 123 extracts, among the selected patches, patches that are set to "Important" as the patch type, that have not been deleted on the other virtual servers 2, that are on the virtual servers 2 having operated at more than a predetermined operating rate, and that are up to date but not just released, as patches to be applied. The patch management DB 111 is used to determine whether the patch type is "Important" and whether the patches are up to date but not just released. The server information management DB 114 is used to determine whether the patches have not been deleted on the other virtual servers 2 and whether the patches are on the virtual servers 2 that have operated at more than a predetermined operating rate. The reason for extracting the patches that have not been deleted on the other virtual servers 2 is that the patches are presumed to have no influence on the operation of jobs. The reason for extracting the patches that are on the virtual servers 2 that have operated at more than a predetermined operating rate is that applying the patches are presumed to have no influence. The reason for extracting the patches that are up to date but not just released is that the patches are presumed to have proven records. The patch extraction unit 123 stores the extracted patches to be applied in the optimal patch list data 116.

When the patch extraction unit 123 has not succeeded in selecting the other virtual servers 2 that are the same as the deployed virtual server 2 in terms of the identification name of the template, the OS, the use, and the configuration of the MW, the patch extraction unit 123 selects other virtual servers 2 that have similar configurations to that of the deployed virtual server 2. For example, with reference to the server information management DB 114, the patch extraction unit 123 selects other virtual servers 2 that are the same as the deployed virtual server 2 in terms of the OS, the use, and any piece of the MW. At this time, with reference to the server information management DB 114, the patch extraction unit 123 excludes other virtual servers 2 that have neither been operating nor been patched for a certain past period. This is because the virtual servers 2 that have neither been operating nor been patched for a certain past period may have had no maintenance, and a needed patch may not be able to be extracted. The certain past period is, for example, six months, but only needs to be a period enough to determine that no maintenance has been carried out. Then, the patch extraction unit 123 lists all of the selected other virtual servers 2 in the server list data 115.

When more than one of the other virtual servers 2 has been selected, the patch extraction unit 123 selects patches applied in common to the other virtual servers 2 among respective patches applied thereto. The patch extraction unit 123 extracts, among the selected patches, patches that are set to "Important" as the patch type, that have not been deleted on the other virtual servers 2, and that are up to date but not just released, as patches to be applied. The patch management DB 111 is used to determine whether the patch type is "Important" and whether the patches are up to date but not just released. The server information management DB 114 is used to determine whether the patches have not been deleted on the other virtual servers 2. The patch extraction unit 123 stores the extracted patches to be applied in the optimal patch list data 116.

The patch extraction unit 123 deletes unneeded patches from the patches deployed by the virtual server deployment unit 122. Specifically, if any of the patches applied in advance to the virtual image of the template have been deleted while the other virtual servers 2 are operating, the patch extraction unit 123 determines the deleted patches as application-canceled patches. For example, with reference to the server information management DB 114, the patch extraction unit 123 selects the already deleted patches from the selected other virtual servers 2. Then, with reference to the template management DB 113, the patch extraction unit 123 determines whether the selected already deleted patches have been applied to the template of the deployed virtual server 2. The patch extraction unit 123 registers the applied patches as the application-canceled patches in the optimal patch list data 116.

Figure 7:
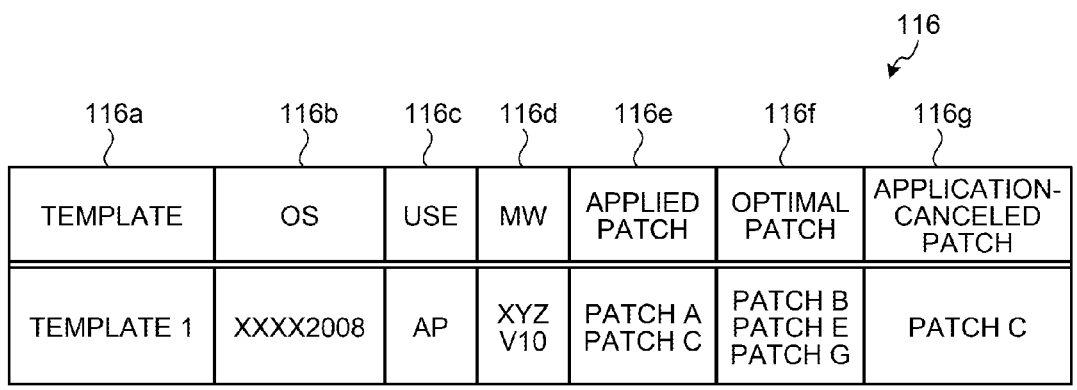
FIG. 7 is a diagram illustrating an example of a data structure of optimal patch list data.

A data structure of the optimal patch list data 116 will be described with reference to FIG. 7. FIG. 7 is a diagram illustrating an example of the data structure of the optimal patch list data. As illustrated in FIG. 7, the optimal patch list data 116 stores therein an OS 116b, a use 116c, MW 116d, an applied patch 116e, an optimal patch 116f, and an application-canceled patch 116g, in association with a template 116a. The template 116a, the OS 116b, the MW 116d, and the applied patch 116e correspond to the template 113a, the OS 113b, the installed MW 113d, and the applied patch 113g, respectively, of the template management DB 113. The use 116c corresponds to the use 114d of the server information management DB 114. The optimal patch 116f represents patches other than the already applied patches among the patches to be applied that have been extracted by the patch extraction unit 123. The application-canceled patch 116g represents the application-canceled patches extracted by the patch extraction unit 123. The template 113a, the OS 113b, the installed MW 113d, and the applied patch 113g stored in the template management DB 113 corresponding to those of the deployed virtual server 2 are stored as the template 116a, the OS 116b, the MW 116d, and the applied patch 116e, respectively. The use 114d stored in the server information management DB 114 corresponding to that of the deployed virtual server 2 is stored as the use 116c.

As an example, when the template 116a is set to "Template 1", the optimal patch list data 116 stores therein "XXXX2008" as the OS 116b, "AP" as the use 116c, "XYZ V10" as the MW 116d, "Patch A Patch C" as the applied patch 116e, "Patch B Patch E Patch G" as the optimal patch 116f, and "Patch C" as the application-canceled patch 116g.

Referring back to FIG. 1, the patch application unit 124 applies the optimal patches to the deployed virtual server 2. The patch application unit 124 deletes the patches excluded from application among the patches applied to the deployed virtual server 2. For example, with reference to the optimal patch list data 116, the patch application unit 124 applies the optimal patch 116f to the virtual server 2 deployed by the virtual server deployment unit 122, via the agent 24. Also, with reference to the optimal patch list data 116, the patch application unit 124 deletes the application-canceled patch 116g from the virtual server 2 deployed by the virtual server deployment unit 122, via the agent 24.

Specific Example of Patch Extraction Process

Figure 8:
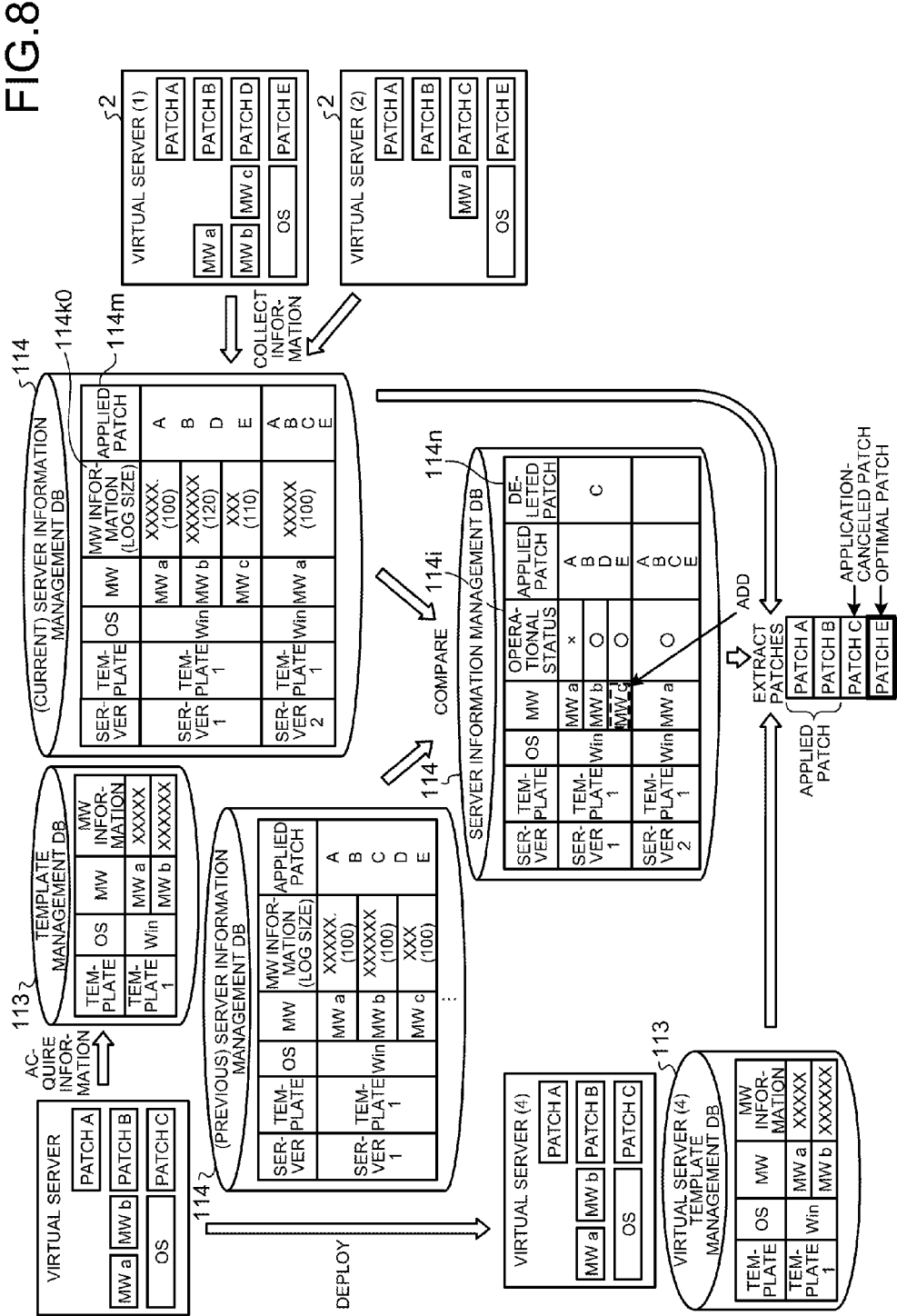
FIG. 8 is a diagram illustrating a specific example of a patch extraction process according to the embodiment.

FIG. 8 is a diagram illustrating a specific example of a patch extraction process according to the embodiment. In FIG. 8, a virtual image of a template 1 is deployed to a virtual server (4). As illustrated in FIG. 8, an OS, and MW a and b are installed, and patches A, B, and C are applied, to the virtual image of the template 1. The template management DB 113 manages the template 1 of the virtual image.

Under this situation, the server information collection unit 121 periodically collects various types of information from all of the virtual servers 2 managed by the server information management DB 114. In this case, the server information collection unit 121 collects log sizes of services or processes as the MW information, and the application status of the patches from the virtual servers (1) and (2)

The server information collection unit 121 stores the collected various types of information in the server information management DB 114. In this case, with respect to the virtual server (1), a log size 114k0 of a service that starts the MW a is stored to be 100 as the MW information corresponding to the MW a. The log size 114k0 of a service that starts the MW b is stored to be 120 as the MW information corresponding to the MW b. The log size 114k0 of a service that starts MW c is stored to be 110 as the MW information corresponding to the MW c. "A B D E" is stored as the applied patch 114m. With respect to the virtual server (2), the log size 114k0 of a service that starts the MW a is stored to be 100 as the MW information corresponding to the MW a. "A B C E" is stored as the applied patch 114m.

The server information collection unit 121 compares the size of the currently collected log of the service that starts each piece of the MW corresponding to each of the virtual servers 2 with the size of the previously collected log of the service that starts the same MW, and determines whether the MW is in operation. The server information collection unit 121 stores the determination result for each piece of the MW on each of the virtual servers 2 in the server information management DB 114. In this case, the size is the same between the previous log and the current log for the MW a corresponding to the virtual server (1), so that the MW a is determined as not being in operation, and thus, "X" is stored. The size differs between the previous log and the current log for the MW b corresponding to the virtual server (1), so that the MW b is determined as being in operation, and thus, "O" is stored. In the same manner, the MW c corresponding to the virtual server (1) is determined as being in operation, and thus, "O" is stored. The MW a corresponding to the virtual server (2) is determined as being in operation, and thus, "O" is stored.

Then, the server information collection unit 121 compares the configuration of the MW of the virtual image corresponding to each of the virtual servers 2 with the currently collected configuration of the MW, and determines MW that has been added or deleted after the deployment. In this case, the "Template 1" was used when the virtual server (1) was deployed. Accordingly, the server information collection unit 121 compares the configuration of the M (MW a and MW b) corresponding to the template 1 of the template management DB 113 with the current configuration of the M (MW a, MW b, and MW c) corresponding to the virtual server (1) of the server information management DB 114. The server information collection unit 121 determines that the MW c has been added after the deployment. In the same manner, the server information collection unit 121 determines that the MW b has been deleted from the virtual server (2) after the deployment.

As an example, the server information collection unit 121 compares the information on the patches applied to the virtual image corresponding to each of the virtual servers 2 with the currently collected information on patches, and determines patches that have been added or deleted after the deployment. The server information collection unit 121 stores the determination result for each of the virtual servers 2 in the server information management DB 114. In this case, for the virtual server (1), the previously collected information on the patches is represented as "A B C D E", and the currently collected information on the patches is represented as "A B D E". This causes the server information collection unit 121 to determine that the patch C has been deleted, and store "C" as the deleted patch 114n.

The virtual server deployment unit 122 performs the deployment to the virtual server (4) using the virtual image. In this case, the OS, and the MW a and b are deployed, and the patches A, B, and C are applied.

The patch extraction unit 123 acquires the identification name of the template, the OS, the use, and the configuration of the MW of the deployed virtual server (4), with reference to the template management DB 113. With reference to the server information management DB 114, the patch extraction unit 123 selects other virtual servers 2 that are the same as the deployed virtual server (4) in terms of the identification name of the template, the OS, the use, and the configuration of the MW. In this case, the configuration of the MW of the deployed virtual server (4) is represented as "MW a MW b". However, the configuration of the MW of the deployed virtual server (1) is represented as "MW a MW b MW c", and the configuration of the MW of the deployed virtual server (2) is represented as "MW a". This does not allow the patch extraction unit 123 to select other virtual servers 2 that are the same as the deployed virtual server (4) in terms of the identification name of the template, the OS, the use, and the configuration of the MW.

This leads the patch extraction unit 123 to select other virtual servers 2 that have similar configurations to that of the deployed virtual server (4). For example, with reference to the server information management DB 114, the patch extraction unit 123 selects other virtual servers 2 that are the same as the deployed virtual server (4) in terms of the OS, the use, and any piece of the MW. In this case, the virtual servers (1) and (2) are selected.

Since more than one of the other virtual servers 2 has been selected, the patch extraction unit 123 selects patches applied in common to the other virtual servers 2 among the respective patches applied thereto. In this case, the patches applied to the virtual server (1) are represented as "A B D E", and the patches applied to the virtual server (2) are represented as "A B C E", so that the patches A, B, and E are selected as the patches applied in common.

The patch extraction unit 123 excludes patches that are applied in advance to the virtual image from the selected patches. In this case, the patches A, B, and C are applied to the virtual image of the template 1, so that the patches A and B are excluded from the patches A, B, and E. This results in the selection of the patch E.

The patch extraction unit 123 extracts, among the selected patches, patches that are set to "Important" as the patch type, that have not been deleted on the other virtual servers 2, and that are up to date but not just released, as patches to be applied. In this case, the selected patch E is extracted as a patch to be applied.

If any of the patches applied in advance to the virtual image have been deleted while the other virtual servers 2 are operating, the patch extraction unit 123 determines the deleted patches as application-canceled patches. In this case, the patch "C" is stored as the deleted patch 114n of the server information management DB 114, so that the patch extraction unit 123 determines the patch C as an application-canceled patch.

As a result, the patch extraction unit 123 extracts the patch E as an optimal patch, and extracts the patch C as an application-canceled patch. Thereafter, the patch application unit 124 applies the patch E extracted as an optimal patch to the virtual server (4), and deletes the patch C extracted as an application-canceled patch from the virtual server (4).

Flowchart of Server Information Collection Process

Figure 9:
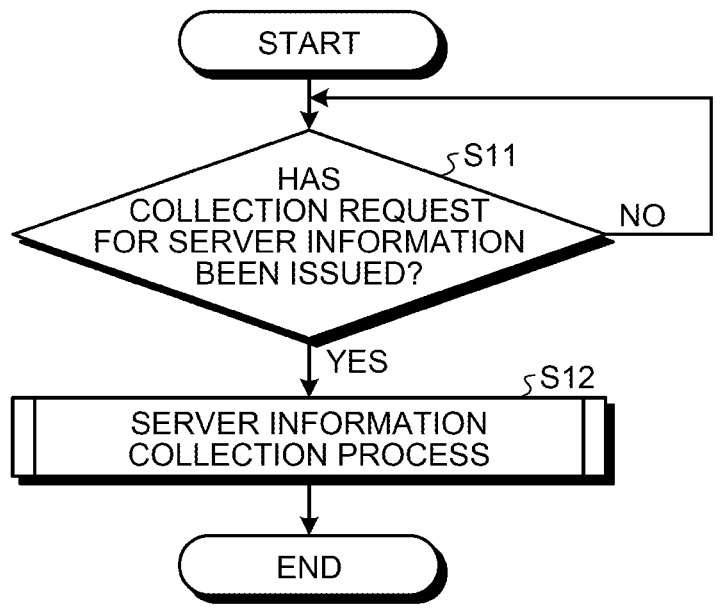
FIG. 9 is a flowchart illustrating an overall procedure of a server information collection process according to the embodiment.

An overall procedure of a server information collection process will be described with reference to FIG. 9. FIG. 9 is a flowchart illustrating the overall procedure of the server information collection process according to the embodiment.

First, the server information collection unit 121 determines whether a collection request for server information has been issued (Step S11). If not (No at Step S11), the server information collection unit 121 repeats the determination process until the collection request for server information is issued.

If the collection request for server information has been issued (Yes at Step S11), the server information collection unit 121 performs the server information collection process (Step S12). For example, the server information collection unit 121 instructs all of the virtual servers 2 stored in the server information management DB 114 to collect the server information, and collects the server information from the virtual servers 2. Thereafter, the server information collection unit 121 terminates the process.

Figure 10:
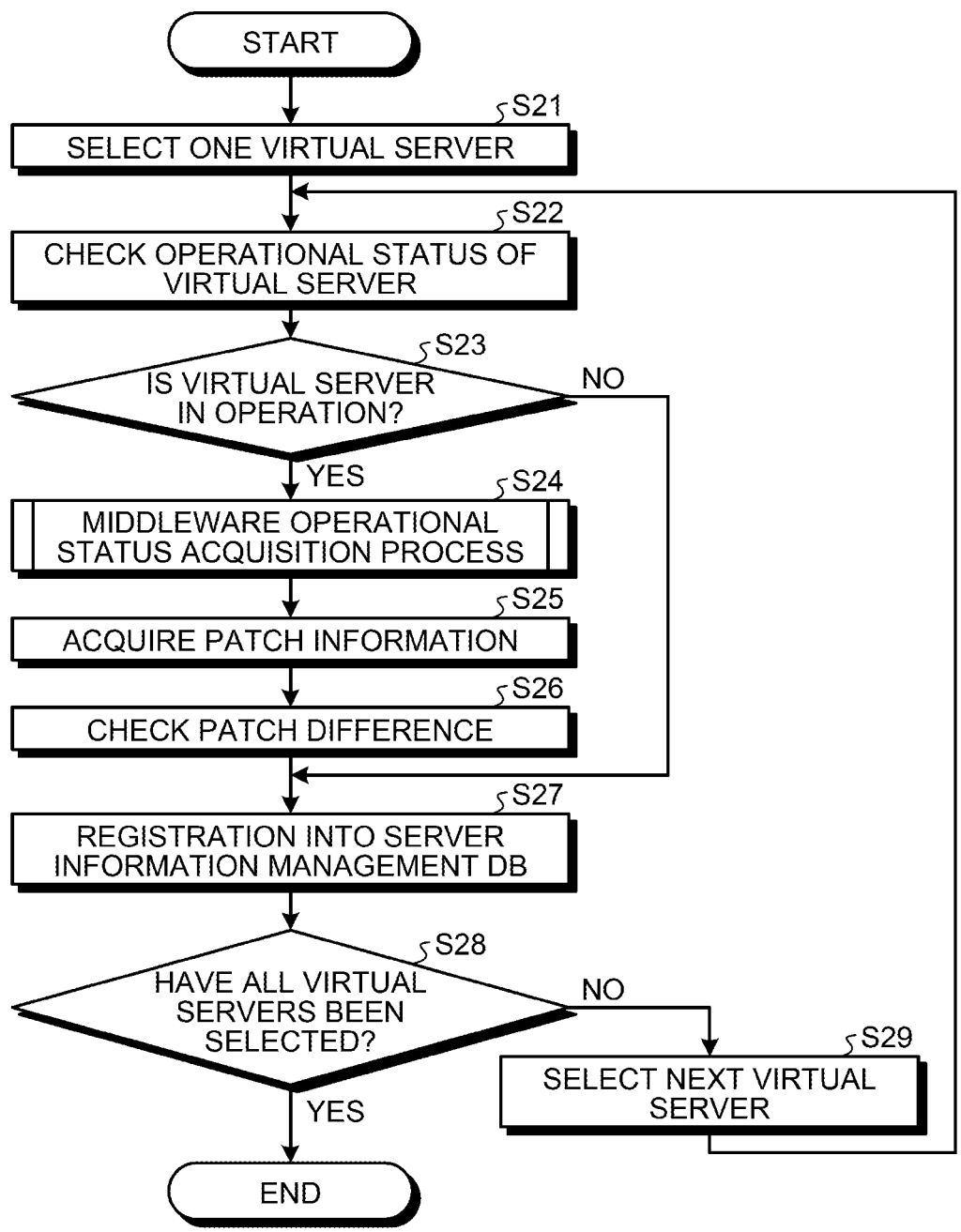
FIG. 10 is a flowchart illustrating a procedure of the server information collection process according to the embodiment.

A procedure of the server information collection process will be described with reference to FIG. 10. FIG. 10 is a flowchart illustrating the procedure of the server information collection process according to the embodiment. The server information collection unit 121 is assumed to have received responses to the collection instruction of the server information issued to the virtual servers 2.

After receiving the responses to the collection instruction of the server information from the virtual servers 2, the server information collection unit 121 selects one of all the virtual servers 2 stored in the server information management DB 114 (Step S21).

The server information collection unit 121 checks the operational status of the selected virtual server 2 (Step S22). For example, the server information collection unit 121 determines whether a response is received from the selected virtual server 2. If so, the server information collection unit 121 determines that the selected virtual server 2 is in operation. If not, the server information collection unit 121 determines that the selected virtual server 2 is not in operation.

The server information collection unit 121 determines whether the selected virtual server 2 is in operation (Step S23). If not (No at Step S23), the server information collection unit 121 performs a process at Step S27 to store information indicating that the selected virtual server 2 is not in operation. If the selected virtual server 2 is in operation (Yes at Step S23), the server information collection unit 121 performs the middleware operational status acquisition process (Step S24).

Next, the server information collection unit 121 acquires the information on the applied patches (Step S25). The server information collection unit 121 checks the difference in the patches (Step S26). For example, the server information collection unit 121 compares the information on the patches applied to the virtual image (template) corresponding to the selected virtual server 2 with the currently acquired information on the patches, and determines patches that have been added or deleted after the deployment. In addition, the server information collection unit 121 compares the previously acquired information on the patches with the currently acquired information on the patches, and determines patches that have been added or deleted after the previous acquisition.

The server information collection unit 121 registers the collected various types of information in the server information management DB 114 (Step S27). For example, when the virtual server 2 is not in operation, the server information collection unit 121 sets the information indicating that the virtual server 2 is not in operation in the server information management DB 114. When the virtual server 2 is in operation, the server information collection unit 121 sets the operational status of the virtual server 2 in the server information management DB 114. The server information collection unit 121 sets the operational status of the MW in the server information management DB 114. The server information collection unit 121 sets the application status of the patches in the server information management DB 114.

The server information collection unit 121 determines whether all of the virtual servers 2 have been selected (Step S28). If so (Yes at Step S28), the server information collection unit 121 terminates the process. If not (No at Step S28), the server information collection unit 121 selects the next virtual server 2 (Step S29), and performs the process at Step S22.

Procedure of Middleware Operational Status Acquisition Process

Figure 11:
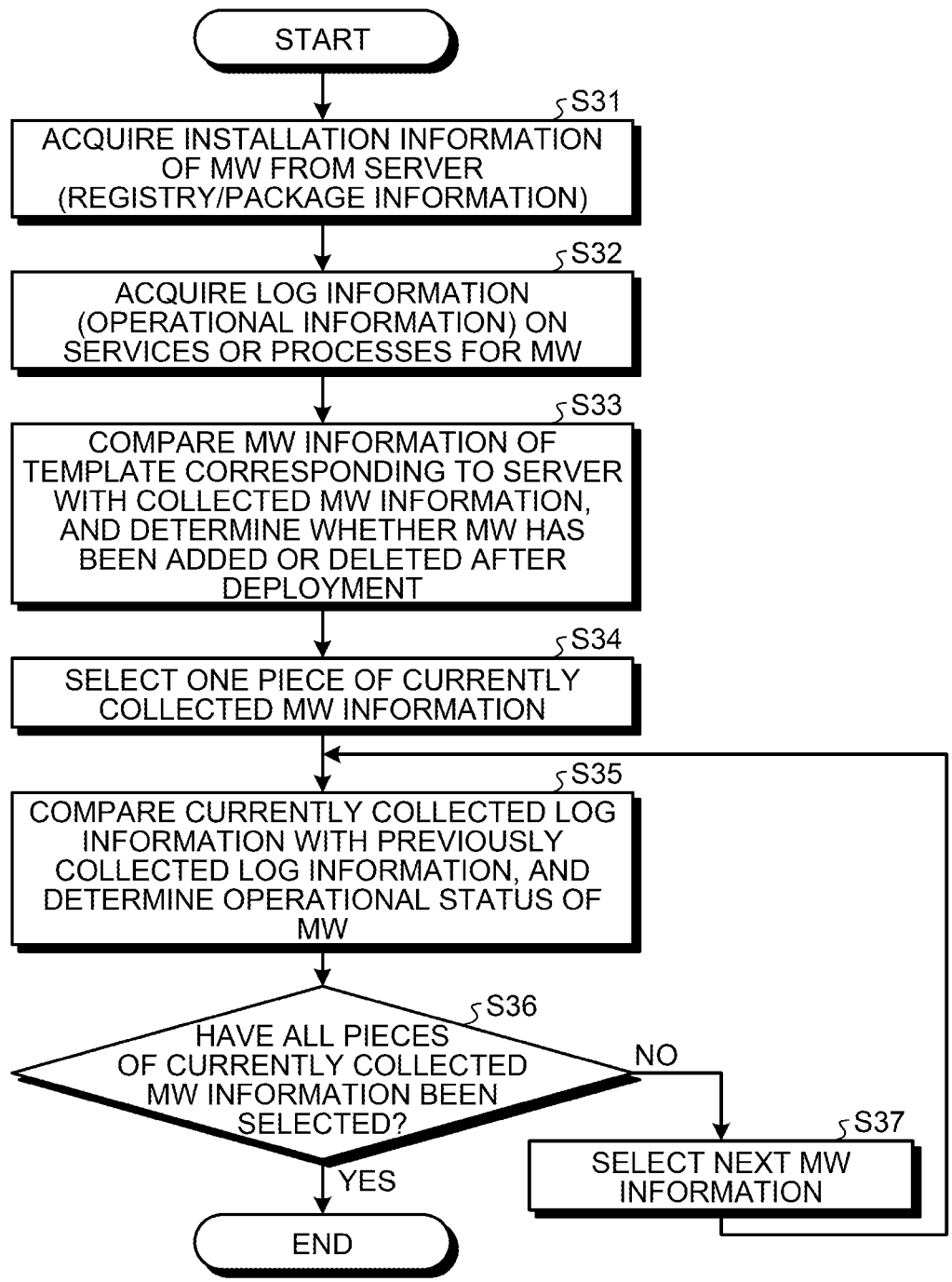
FIG. 11 is a flowchart illustrating a procedure of a middleware operational status acquisition process.

A procedure of the middleware (MW) operational status acquisition process will be described with reference to FIG. 11. FIG. 11 is a flowchart illustrating the procedure of the middleware operational status acquisition process.

The server information collection unit 121 acquires installation information of the MW from the selected virtual server 2 (Step S31). For example, the server information collection unit 121 acquires the installation status and the installation destination of the MW from the selected virtual server 2. The agent 24 collects the installation status and the installation destination of the MW from an area (registry or package information) that differs depending on the OS. If the server information collection unit 121 periodically collects the installation information of the MW, the server information collection unit 121 need not collect the installation information of the MW at this step.

The server information collection unit 121 acquires the log information on the services or processes that start the MW (Step S32). This is performed to obtain the operational status of the MW. The server information collection unit 121 compares the MW information of the template corresponding to the virtual server 2 with the currently collected MW information, and determines whether MW has been added or deleted after the deployment (Step S33). The term "MW information" here means the MW information 113*c* of the template corresponding to the virtual server 2 stored in the template management DB 113, and the MW information for respective pieces of the MW corresponding to the virtual server 2 stored in the server information management DB 114.

Next, the server information collection unit 121 selects one piece of the currently collected MW information (Step S34). Regarding the selected piece of the MW information, the server information collection unit 121 compares the currently collected log information with the previously collected log information, and determines the operational status of the MW (Step S35). For example, if the size of the currently collected log differs from the size of the previously collected log, the server information collection unit 121 determines that the piece of the MW is in operation. If the size of the currently collected log equals the size of the previously collected log, the server information collection unit 121 determines that the piece of the MW is not in operation.

The server information collection unit 121 determines whether all pieces of the currently collected MW information have been selected (Step S36). If so (Yes at Step S36), the server information collection unit 121 terminates the process. If not (No at Step S36), the server information collection unit 121 selects the next piece of MW information (Step S37), and performs the process at Step S35.

Overall Procedure of Virtual Server Deployment Process

Figure 12:
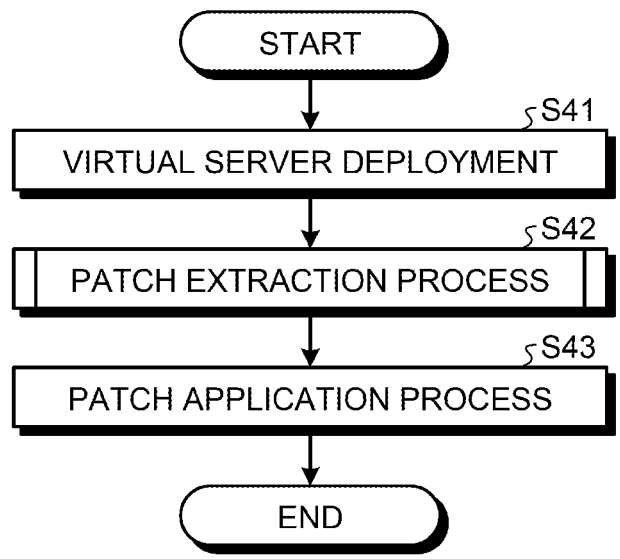
FIG. 12 is a flowchart illustrating an overall procedure of a virtual server deployment process according to the embodiment.

An overall procedure of the virtual server deployment process will be described with reference to FIG. 12. FIG. 12 is a flowchart illustrating the overall procedure of the virtual server deployment process according to the embodiment.

First, selection of a virtual image (template) by the user causes the virtual server deployment unit 122 to use the selected virtual image to deploy a virtual server 2 (Step S41). Then, the patch extraction unit 123 performs the patch extraction process for the deployed virtual server 2 (Step S42). Thereafter, the patch application unit 124 performs the patch application process to apply the extracted patches to the deployed virtual server 2 (Step S43).

Procedure of Patch Extraction Process

Figure 13:
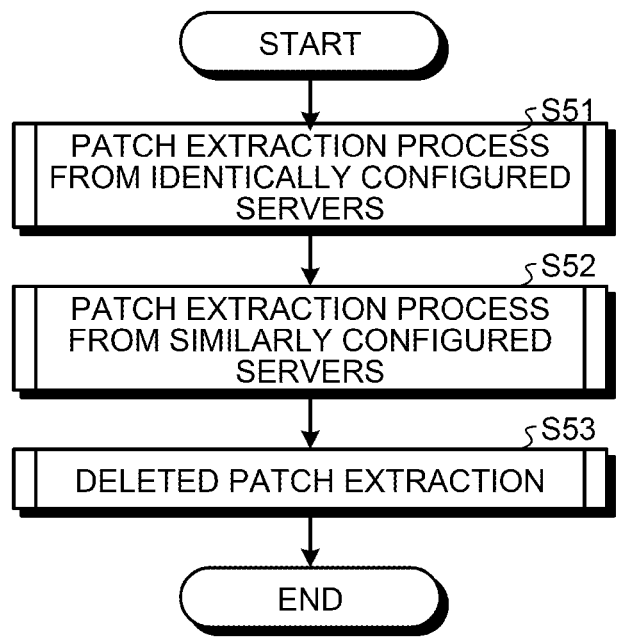
FIG. 13 is a flowchart illustrating a procedure of the patch extraction process.

A procedure of the patch extraction process will be described with reference to FIG. 13. FIG. 13 is a flowchart illustrating the procedure of the patch extraction process.

First, the patch extraction unit 123 performs the patch extraction process from virtual servers 2 that have an identical configuration to that of the deployed virtual server 2 (Step S51). Next, if no virtual servers 2 exist that have an identical configuration to that of the deployed virtual server 2, the patch extraction unit 123 performs the patch extraction process from virtual servers 2 that have similar configurations to that of the deployed virtual server 2 (Step S52). Then, the patch extraction unit 123 extracts deleted patches to be deleted from the patches extracted by the patch extraction process (Step S53).

Procedure of Patch Extraction Process from Identically Configured Servers

Figure 14:
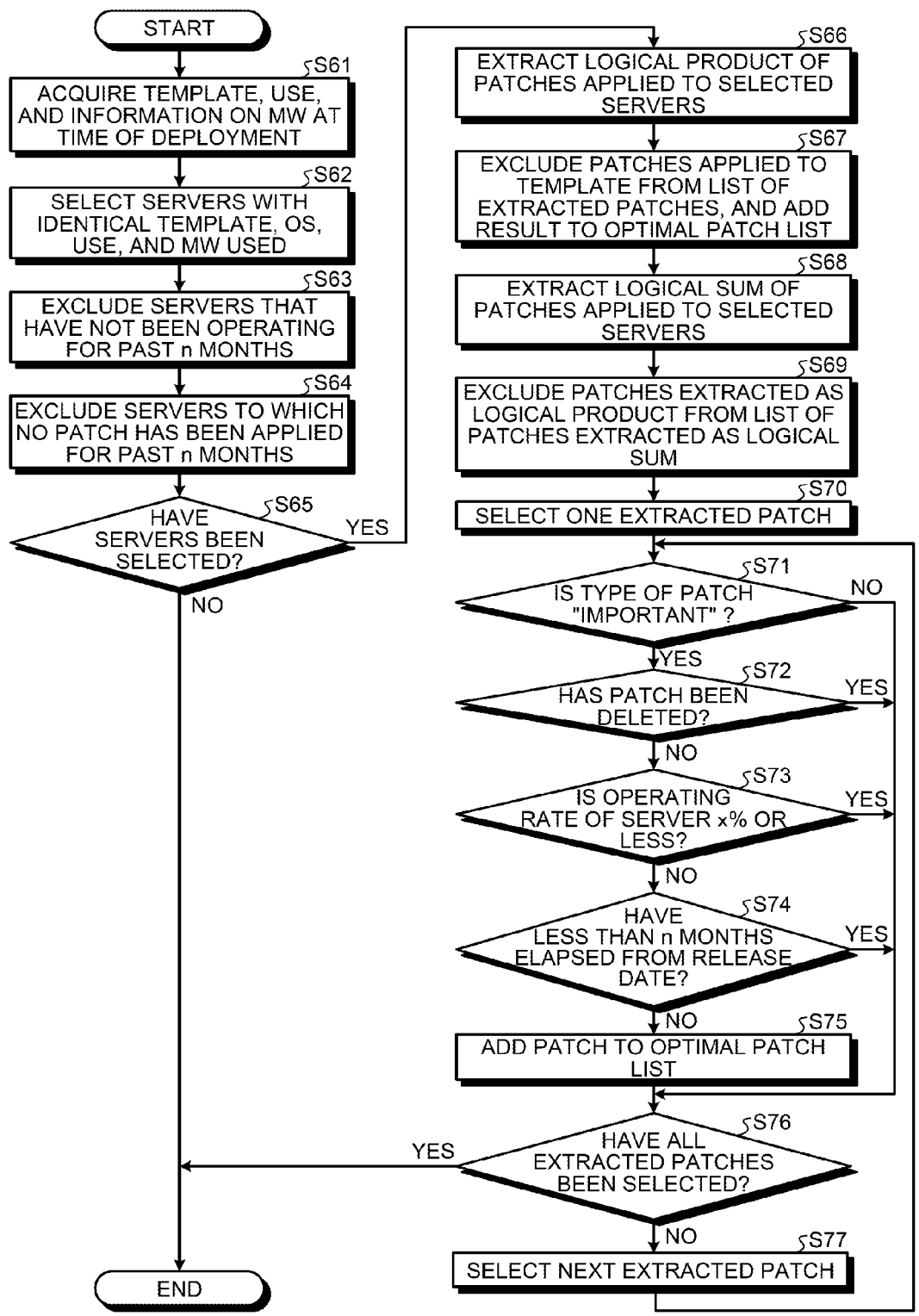
FIG. 14 is a flowchart illustrating a procedure of the patch extraction process from identically configured servers.

A procedure of the patch extraction process from the identically configured servers will be described with reference to FIG. 14. FIG. 14 is a flowchart illustrating the procedure of the patch extraction process from the identically configured servers.

First, the patch extraction unit 123 acquires the template, the use, and the information on the MW of the deployed virtual server 2 at the time of deployment (Step S61). Then, with reference to the server information management DB 114, the patch extraction unit 123 selects virtual servers 2 on which the template, the OS, the use, and the MW used are the same as those acquired (Step S62). The patch extraction unit 123 lists the selected other virtual servers 2 in the server list data 115.

The patch extraction unit 123 excludes virtual servers 2 that have not been operating for the last n months from the selected virtual servers 2 (Step S63). For example, with reference to the last check date of the operation record 114e in the server information management DB 114, the patch extraction unit 123 deletes the virtual servers 2 that have not been operating for the last n months from the virtual servers 2 listed in the server list data 115.

In addition, the patch extraction unit 123 excludes virtual servers 2 to which no patch has been applied for the last n months from the selected virtual servers 2 (Step S64). For example, with reference to the last patch application date 114l of the server information management DB 114, the patch extraction unit 123 deletes the virtual servers 2 to which no patch has been applied for the last n months from the virtual servers 2 listed in the server list data 115.

Then, with reference to the server list data 115, the patch extraction unit 123 determines whether virtual servers 2 have been selected (Step S65). If not (No at Step S65), the patch extraction unit 123 terminates the process.

If virtual servers 2 have been selected (Yes at Step S65), the patch extraction unit 123 extracts a logical product of patches already applied to the selected virtual servers 2, with reference to the server information management DB 114 (Step S66). In other words, when a plurality of virtual servers 2 have been selected, the patch extraction unit 123 extracts patches applied in common to the selected virtual servers 2 among the respective patches applied thereto.

Then, the patch extraction unit 123 excludes the patches already applied to the template of the deployed virtual server 2 at the time of deployment from the list of the extracted patches, and adds the result to the optimal patch list data 116 (Step S67). Furthermore, with reference to the server information management DB 114, the patch extraction unit 123 extracts a logical sum of the patches already applied to the selected virtual servers 2 (Step S68). In other words, the patch extraction unit 123 extracts the patches applied to any of the virtual servers 2. Then, the patch extraction unit 123 excludes the patches extracted as the logical product from the list of the patches extracted as the logical sum (Step S69).

Next, the patch extraction unit 123 selects one patch from the list of the patches extracted as the logical sum (Step S70). With reference to the patch management DB 111, the patch extraction unit 123 determines whether the type of the selected patch is "Important" (Step S71). If not (No at Step S71), the patch extraction unit 123 performs a process at Step S76 to select the next patch to be extracted.

If the type of the selected patch is "Important" (Yes at Step S71), the patch extraction unit 123 determines whether the selected patch has ever been deleted (Step S72). If the selected patch has ever been deleted, applying the selected patch can have an influence on the operation of jobs. This determination is made to preclude application of such a patch. For example, with reference to the deleted patch 114n of the server information management DB 114, the patch extraction unit 123 determines whether the selected patch is included in the deleted patches.

If the selected patch has ever been deleted (Yes at Step S72), the patch extraction unit 123 performs the process at Step S76 to select the next patch to be extracted.

If not (No at Step S72), the patch extraction unit 123 determines whether the operating rate of the virtual server 2 to which the selected patch is applied is x % or less (Step S73). If the operating rate of the virtual server 2 to which the selected patch is applied is x % or less, applying the selected patch can have an influence on the operation of jobs. This determination is made to preclude application of such a patch. For example, with reference to the operating rate 114f of the server information management DB 114, the patch extraction unit 123 determines whether the operating rate of the virtual server 2 to which the selected patch is applied is x % or less.

If so (Yes at Step S73), the patch extraction unit 123 performs the process at Step S76 to select the next patch to be extracted.

If the operating rate of the virtual server 2 to which the selected patch is applied is not x % or less (No at Step S73), the patch extraction unit 123 determines whether less than n months have elapsed from the latest release date of the selected patch (Step S74). If less than n months have elapsed from the latest release date of the selected patch, applying the selected patch can have an influence on the operation of jobs. This determination is made to preclude application of such a patch. For example, with reference to the release date 111e of the patch management DB 111, the patch extraction unit 123 determines whether less than n months have elapsed from the release date of the selected patch.

If so (Yes at Step S74), the patch extraction unit 123 performs the process at Step S76 to select the next patch to be extracted. If not (No at Step S74), the patch extraction unit 123 adds the selected patch to the optimal patch list data 116 (Step S75).

The patch extraction unit 123 determines whether all patches have been selected from the list of the patches extracted as the logical sum (Step S76). If so (Yes at Step S76), the patch extraction unit 123 terminates the process. If not (No at Step S76), the patch extraction unit 123 selects the next patch from the list of the patches (Step S77), and performs the process at Step S71.

Procedure of Patch Extraction Process from Similarly Configured Servers

Figure 15:
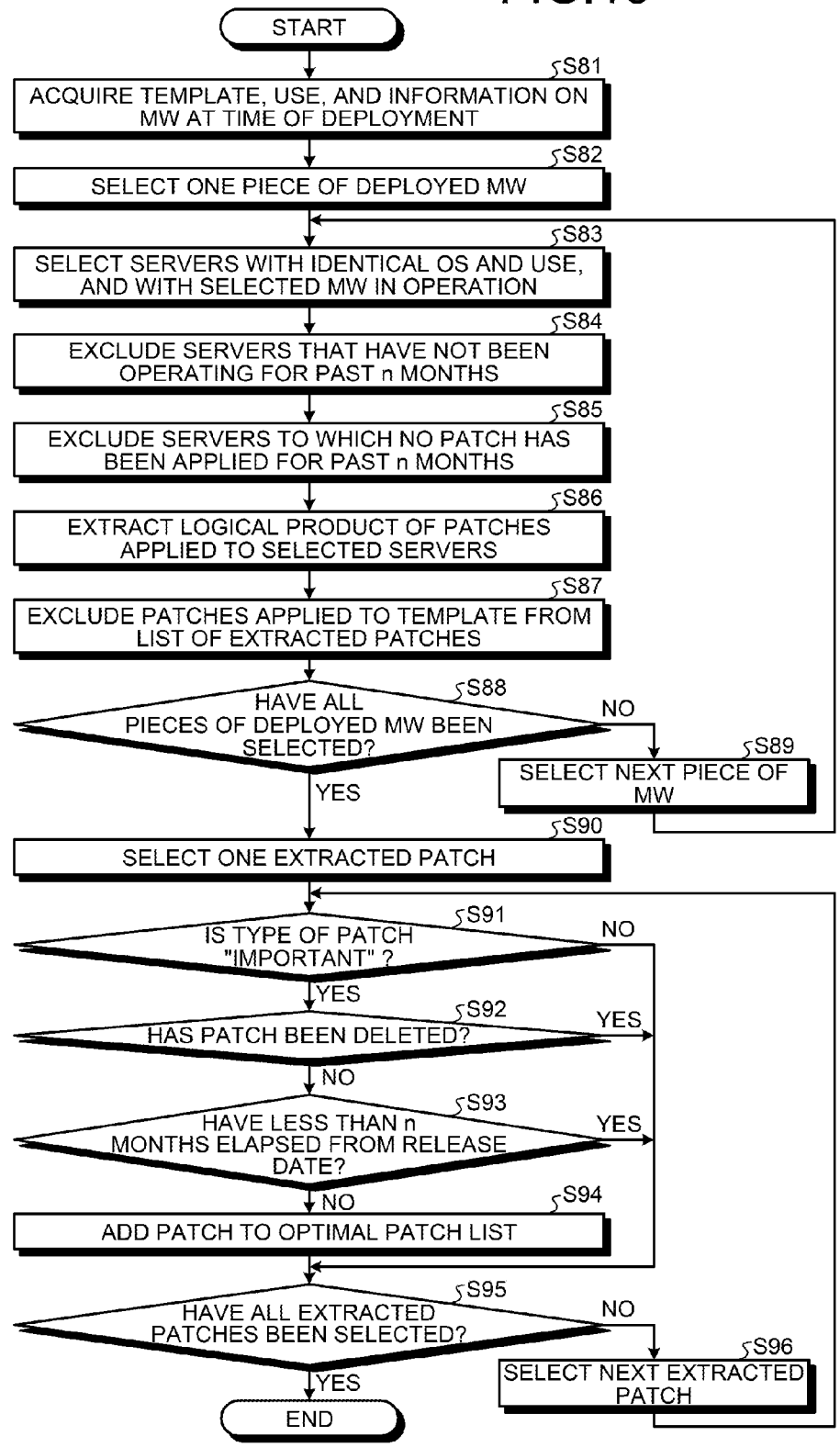
FIG. 15 is a flowchart illustrating a procedure of the patch extraction process from similarly configured servers.

A procedure of the patch extraction process from the similarly configured servers will be described with reference to FIG. 15. FIG. 15 is a flowchart illustrating the procedure of the patch extraction process from the similarly configured servers.

First, the patch extraction unit 123 acquires the template, the use, and the information on the MW of the deployed virtual server 2 at the time of deployment (Step S81). Then, the patch extraction unit 123 selects one piece of the deployed MW from the template (Step S82). With reference to the server information management DB 114, the patch extraction unit 123 selects virtual servers 2 on which the OS and the use are the same as those acquired, and on which the selected piece of the MW is in operation (Step S83). The patch extraction unit 123 lists the selected other virtual servers 2 in the server list data 115.

The patch extraction unit 123 excludes virtual servers 2 that have not been operating for the last n months from the selected virtual servers 2 (Step S84). For example, with reference to the last check date of the operation record 114e in the server information management DB 114, the patch extraction unit 123 deletes the virtual servers 2 that have not been operating for the last n months from the virtual servers 2 listed in the server list data 115.

In addition, the patch extraction unit 123 excludes virtual servers 2 to which no patch has been applied for the last n months from the selected virtual servers 2 (Step S85). For example, with reference to the last patch application date 114*l* of the server information management DB 114, the patch extraction unit 123 deletes the virtual servers 2 to which no patch has been applied for the last n months from the virtual servers 2 listed in the server list data 115.

With reference to the server information management DB 114, the patch extraction unit 123 extracts a logical product of patches already applied to the selected virtual servers 2 (Step S86). In other words, when a plurality of virtual servers 2 have been selected, the patch extraction unit 123 extracts patches applied in common to the selected virtual servers 2 among the respective patches applied thereto.

Then, the patch extraction unit 123 excludes the patches already applied to the template of the deployed virtual server 2 at the time of deployment from the list of the extracted patches (Step S87). The patch extraction unit 123 determines whether all pieces of the deployed MW have been selected from the template (Step S88). If not (No at Step S88), the patch extraction unit 123 selects the next piece of the MW from the template (Step S89), and performs the process at Step S83.

If all pieces of the deployed MW have been selected (Yes at S88), the patch extraction unit 123 selects one patch from the list of the extracted patches (Step S90). With reference to the patch management DB 111, the patch extraction unit 123 determines whether the type of the selected patch is "Important" (Step S91). If not (No at Step S91), the patch extraction unit 123 performs a process at Step S95 to select the next patch to be extracted.

If the type of the selected patch is "Important" (Yes at Step S91), the patch extraction unit 123 determines whether the selected patch has ever been deleted (Step S92). If the selected patch has ever been deleted, applying the selected patch can have an influence on the operation of jobs. This determination is made to preclude application of such a patch. For example, with reference to the deleted patch 114n of the server information management DB 114, the patch extraction unit 123 determines whether the selected patch is included in the deleted patches.

If the selected patch has ever been deleted (Yes at Step S92), the patch extraction unit 123 performs a process at Step S95 to select the next patch to be extracted.

If not (No at Step S92), the patch extraction unit 123 determines whether less than n months have elapsed from the latest release date of the selected patch (Step S93). If less than n months have elapsed from the latest release date of the selected patch, applying the selected patch can have an influence on the operation of jobs. This determination is made to preclude application of such a patch. For example, with reference to the release date 111e of the patch management DB 111, the patch extraction unit 123 determines whether less than n months have elapsed from the release date of the selected patch.

If so (Yes at Step S93), the patch extraction unit 123 performs the process at Step S95 to select the next patch to be extracted. If not (No at Step S93), the patch extraction unit 123 adds the selected patch to the optimal patch list data 116 (Step S94).

The patch extraction unit 123 determines whether all patches have been selected from the list of the extracted patches (Step S95). If so (Yes at Step S95), the patch extraction unit 123 terminates the process. If not (No at Step S95), the patch extraction unit 123 selects the next patch from the list of the extracted patches (Step S96), and performs the process at Step S91.

Procedure of Deleted Patch Extraction Process

Figure 16:
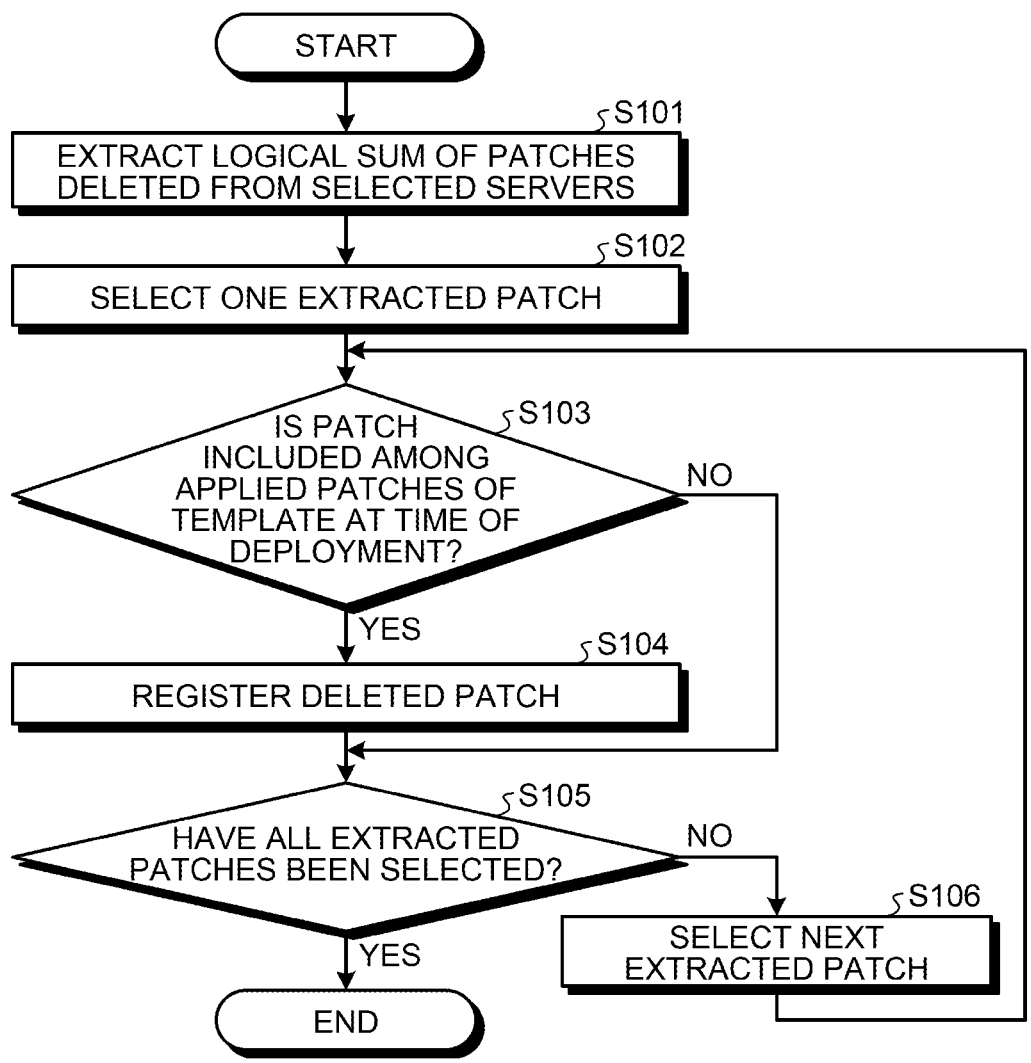
FIG. 16 is a flowchart illustrating a procedure of a deleted patch extraction process.

A procedure of the deleted patch extraction process will be described with reference to FIG. 16. FIG. 16 is a flowchart illustrating the procedure of the deleted patch extraction process.

With reference to the server information management DB 114, the patch extraction unit 123 extracts a logical sum of the patches already deleted from the selected virtual servers 2 (Step S101). The patch extraction unit 123 selects one patch from the list of the extracted patches (Step S102). The patch extraction unit 123 determines whether the selected patch is included among the already applied patches of the template at the time of deployment (Step S103). For example, with reference to the template management DB 113, the patch extraction unit 123 determines whether the selected patch is included in the applied patch 113g at the time of deployment.

If not (No at Step S103), the patch extraction unit 123 performs a process at Step S105 to select the next patch to be extracted. If the selected patch is included among the already applied patches of the template at the time of deployment (Yes at Step S103), the patch extraction unit 123 registers the selected patch as a deleted patch in the optimal patch list data 116 (Step S104).

The patch extraction unit 123 determines whether all patches have been selected from the list of the extracted patches (Step S105). If so (Yes at Step S105), the patch extraction unit 123 terminates the process. If not (No at Step S105), the patch extraction unit 123 selects the next patch from the list of the extracted patches (Step S106), and performs the process at Step S103.

Effects of Embodiment

According to the above-described embodiment, the management server 1 includes the server information management DB 114 that stores therein the information on the virtual servers 2 deployed from the virtual images and the information on the software that runs on the virtual servers 2, on a server-by-server basis. The management server 1 refers to the server information management DB 114, and, based on the information on a particular virtual machine deployed from a predetermined virtual image and the information on the software that runs on the particular virtual machine, selects other virtual machines. Based on the details about patches applied to the selected other virtual machines, the management server 1 extracts patches to be applied to the particular virtual machine. This configuration allows the management server 1 to determine whether the patches to be applied to the particular virtual machine can be applied thereto, and thus to extract optimal patches.

According to the above-described embodiment, the server information management DB 114 stores therein the information including the uses and the operation records of the virtual servers 2 as the information on the virtual servers 2, and also stores therein the information including the OSs and the middleware as the information on the software that runs on the virtual servers. With reference to the server information management DB 114, the management server 1 selects other virtual servers that are the same as the particular virtual server 2 in terms of the use, the OS, and the configuration of the middleware. When more than one of the other virtual servers 2 has been selected, the management server 1 extracts common patches as patches to be applied to the particular virtual server 2 among the respective patches applied to the other virtual servers 2. In addition, the management server 1 selects patches applied to any of the other virtual servers 2, and, based on the details about the selected patches, further extracts patches to be applied to the particular virtual server 2. This configuration causes the management server 1 to extract the patches to be applied to the particular virtual server 2 from the other virtual servers 2 that are the same as the particular virtual server 2 in terms of the use, the OS, and the configuration of the middleware, and thereby allows the management server 1 to apply optimal patches to the particular virtual server 2. The management server 1 also extracts the patches to be applied to the particular virtual server 2 from the other virtual servers 2 that are the same as the particular virtual server 2 in terms of the use, and thereby can select patches taking a difference in use into account.

According to the above-described embodiment, when the management server 1 has not succeeded in selecting the other virtual servers 2 that are the same as the particular virtual server 2 in terms of the use, the OS, and the configuration of the middleware, the management server 1 performs the following process. That is, with reference to the server information management DB 114, the management server 1 selects other virtual servers 2 that are the same as the particular virtual server 2 in terms of the OS, the use, and any piece of the middleware. For each piece of the middleware deployed to the particular virtual server 2, when more than one other virtual server 2 exists that has the same piece of the middleware as the piece of the deployed middleware, the management server 1 selects common patches among the respective patches applied to the other virtual servers 2. Based on the details about the selected patches, the management server 1 extracts patches to be applied to the particular virtual server 2. This configuration causes the management server 1 to extract the patches to be applied to the particular virtual server 2 from the other virtual servers 2 that are not the same as the particular virtual server 2 in terms of the use, the OS, and the configuration of the operating middleware but have the same piece of the middleware as the piece of the middleware deployed to the particular virtual server 2. Thus, this configuration allows the management server 1 to apply optimal patches to the particular virtual server 2.

According to the above-described embodiment, when the details about a selected patch indicate that the patch is most important, has not been deleted on any of the other virtual servers 2, and is up to date, the management server 1 extracts the patch as a patch to be applied to the particular virtual server 2. This configuration allows the management server 1 to smoothly perform the operation in jobs by applying the extracted patches.

According to the above-described embodiment, when each of the other virtual servers 2 to which a selected patch is applied has operated at more than a predetermined operating rate, the management server 1 extracts the patch as a patch to be applied to the particular virtual server 2. This configuration allows the management server 1 to extract patches that do not affect the operation by being applied.

Other

The agent 24 has been described as collecting the log information on the services or processes that start the MW. This log information is collected to allow the server information collection unit 121 to determine the operational status of the MW. However, not limited to this, the agent 24 may collect configuration information of files generated by the services or processes that start the MW, for the same purpose. The server information collection unit 121 only needs to compare the currently collected configuration information of files generated by the services or processes that start the MW with the previously collected configuration information of files generated by the services or processes that start the same MW, and determine the operational status of the MW. Specifically, if the previously collected configuration information of files corresponding to the MW differs from the previously collected configuration information of files corresponding to the same MW, the server information collection unit 121 determines that the MW is in operation. If the previously collected configuration information of files corresponding to the MW does not differ from the previously collected configuration information of files corresponding to the same MW, the server information collection unit 121 determines that the MW is not in operation.

The management server 1 can be implemented by providing the above-described functions, such as the server information collection unit 121, the virtual server deployment unit 122, and the patch extraction unit 123, on a known information processing apparatus, such as a personal computer or a workstation.

The components of the illustrated devices are not necessarily needed to be physically configured as illustrated in the drawings. In other words, the specific mode of distribution and integration of the devices is not limited to those illustrated in the drawings, and all or a part thereof can be functionally or physically distributed or integrated in any desired unit according to various types of load and the status of use. For example, the patch extraction unit 123 and the patch application unit 124 may be integrated as one unit. The patch extraction unit 123 may be divided into a first patch extraction unit for extracting patches from the virtual servers 2 that have an identical configuration and a second patch extraction unit for extracting patches from the virtual servers 2 that have similar configurations. The patch management DB 111, the media library 112, the template management DB 113, and the server information management DB 114 may be connected as external devices to the management server 1 via a network.

The various processes described in the embodiment above can be carried out by executing a prepared program on a computer, such as a personal computer or a workstation. A description will be made below of a computer that executes the patch extraction program implementing the same functions as those of the management server 1 illustrated in FIG. 1. FIG. 17 is a diagram illustrating an example of the computer that executes the patch extraction program.

As illustrated in FIG. 17, this computer 200 has a CPU 203 that performs various types of arithmetic processing, an input device 215 that accepts input of data from the user, and a display control unit 207 that controls a display device 209. The computer 200 also has a drive device 213 that reads, for example, the program from a storage medium, and a communication control unit 217 that sends and receives data to and from other computers via a network. The computer 200 also has a memory 201 and an HDD 205 that temporarily store therein various types of information. The memory 201, the CPU 203, the HDD 205, the display control unit 207, the drive device 213, the input device 215, and the communication control unit 217 are connected to each other via a bus 219.

The drive device 213 is a device for, for example, a removable disk 211. The HDD 205 stores therein a patch extraction program 205a and patch extraction-related information 205b.

The CPU 203 reads the patch extraction program 205a, loads the program into the memory 201, and executes it as processes. The processes correspond to the functional units of the management server 1. The patch extraction-related information 205b corresponds to the patch management DB 111, the media library 112, the template management DB 113, the server information management DB 114, the server list data 115, and the optimal patch list data 116. For example, the removable disk 211 stores therein the respective pieces of information, such as the patch extraction program 205a.

The patch extraction program 205a need not be stored in the HDD 205 from the beginning. For example, the program may be stored in a "portable physical medium," such as a flexible disk (FD), a CD-ROM, a DVD, a magneto-optical disc, and an integrated circuit card. The computer 200 may read the patch extraction program 205a from the portable physical medium, and execute the program.

According to an aspect of the present invention, a patch can appropriately be selected.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium storing therein a software correction patch extraction program that causes a computer to execute a process comprising:

referring to a storage unit that stores therein information on a plurality of virtual machines generated from a plurality of virtual images and information on software that operates on each of the plurality of virtual machines;

selecting another virtual machine that is the same as a particular virtual machine in terms of a use, an operating system (OS), and a piece of a middleware from the plurality of virtual machines based on information on the particular virtual machine generated from a certain virtual image and information on software that operates on the particular virtual machine; and extracting a software correction patch to be applied to the particular virtual machine based on a software correction patch applied to the another virtual machine selected at the selecting.

2. The non-transitory computer-readable recording medium according to claim 1, wherein the storage unit stores therein information including uses and operation records of the plurality of virtual machines as the information on the plurality of virtual machines and information including OSs and middleware as the information on the software that operates on each of the plurality of virtual machines;

the selecting, with reference to the storage unit, selects the another virtual machine that is the same as the particular virtual machine in terms of the use, the OS, and a configuration of the middleware; and the extracting extracts, when a plurality of other virtual machines selected at the selecting exist, a common software correction patch as a software correction patch to be applied to the particular virtual machine among software correction patches applied to the plurality of other virtual machines, and selects a software correction patch applied to any of the plurality of other virtual machines, and further extracts a software correction patch to be applied to the particular virtual machine based on details about the selected software correction patch.

3. The non-transitory computer-readable recording medium according to claim 2, wherein the selecting selects the another virtual machine that is the same as the particular virtual machine in terms of the use, the OS, and any piece of the middleware, with reference to the storage unit when the selecting does not select the another virtual machine that is the same as the particular virtual machine in terms of the use, the OS, and the configuration of the middleware; and for each piece of the middleware that operates on the particular virtual machine, when a plurality of other virtual machines that have the same piece of the middleware as that of the particular virtual machine exist, the extracting selects a common software correction patch among software correction patches applied to the plurality of other virtual machines, and extracts a software correction patch to be applied to the particular virtual machine based on the details about the selected software correction patch.

4. The non-transitory computer-readable recording medium according to claim 2, wherein, when the details about the selected software correction patch indicate that the selected software correction patch is set to important as a patch type, has not been deleted on any of the plurality of other virtual machines, and is up to date, the extracting extracts the selected software correction patch as a software correction patch to be applied to the particular virtual machine.

5. The non-transitory computer-readable recording medium according to claim 4, wherein, when each of the plurality of other virtual machines to which the selected software correction patch is applied has operated at more than a certain operating rate, the extracting extracts the selected software correction patch as a software correction patch to be applied to the particular virtual machine.

6. The non-transitory computer-readable recording medium according to claim 4, wherein, when the selected software correction patch is up to date but not just released, the extracting extracts the selected software correction patch as a software correction patch to be applied to the particular virtual machine.

7. A method for extracting a software correction patch on a computer, the method comprising:

referring to a storage unit that stores therein information on a plurality of virtual machines generated from a plurality of virtual images and information on software that operates on each of the plurality of virtual machines using a processor;

selecting another virtual machine that is the same as a particular virtual machine in terms of a use, an operating system (OS), and a piece of a middleware from the plurality of virtual machines based on information on the particular virtual machine generated from a certain virtual image and information on software that operates on the particular virtual machine using the processor; and extracting a software correction patch to be applied to the particular virtual machine based on a software correction patch applied to the another virtual machine selected at the selecting using the processor.

8. An information processing apparatus comprising:

a processor; and a storage unit that stores therein information on a plurality of virtual machines generated from a plurality of virtual images and information on software that operates on each of the plurality of virtual machines, wherein the processor executes a process comprising:

referring to the information on the plurality of virtual machines and the information on the software that operates on each of the plurality of virtual machines stored in the storage unit;

selecting another virtual machine that is the same as a particular virtual machine in terms of a use, an operating system (OS), and a piece of a middleware from the plurality of virtual machines based on information on the particular virtual machine generated from a certain virtual image and information on software that operates on the particular virtual machine; and extracting a software correction patch to be applied to the particular virtual machine based on a software correction patch applied to the another virtual machine selected at the selecting.

* * * * *